(12) United States Patent
Wadehn et al.

(10) Patent No.: US 8,079,761 B1
(45) Date of Patent: Dec. 20, 2011

(54) CYLINDRICAL PLAIN BEARING POCKET ARRANGEMENT AND WIND TURBINE HAVING SUCH A CYLINDRICAL PLAIN BEARING

(75) Inventors: Jörg Wadehn, Trige (DK); Patrik Hager, Torslanda (SE)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 12/893,644

(22) Filed: Sep. 29, 2010

Related U.S. Application Data

(63) Continuation of application No. 12/883,695, filed on Sep. 16, 2010, and a continuation of application No. 12/883,702, filed on Sep. 16, 2010.

(51) Int. Cl.
F16C 32/06 (2006.01)
(52) U.S. Cl. .......... 384/118; 384/100; 384/111
(58) Field of Classification Search ........ 384/100, 384/107–120
See application file for complete search history.

(56) References Cited

U.S. PATENT DOCUMENTS

| | | | | |
|---|---|---|---|---|
| 3,005,666 | A | * | 10/1961 | Morser et al. .......... 384/111 |
| 3,387,899 | A | | 6/1968 | Hahn et al. |
| 3,680,932 | A | | 8/1972 | Raimondi |
| 3,708,215 | A | | 1/1973 | Wilcock et al. |
| 3,853,361 | A | * | 12/1974 | Martt .......... 384/117 |
| 4,029,434 | A | | 6/1977 | Kenney |
| 4,072,372 | A | | 2/1978 | Korrenn et al. |
| 4,184,720 | A | * | 1/1980 | Zacherl .......... 384/109 |
| 4,371,216 | A | | 2/1983 | Suzuki et al. |
| 4,410,220 | A | * | 10/1983 | Robinson .......... 384/109 |
| 4,834,559 | A | | 5/1989 | Kalvoda |
| 5,172,981 | A | * | 12/1992 | Williams et al. .......... 384/108 |
| 5,449,235 | A | * | 9/1995 | Buckmann .......... 384/108 |
| 5,743,657 | A | | 4/1998 | O'Reilly et al. |
| 6,050,727 | A | | 4/2000 | Messmer et al. |
| 6,186,061 | B1 | | 2/2001 | Burns et al. |
| 6,623,164 | B1 | | 9/2003 | Gozdawa |
| 6,739,756 | B2 | | 5/2004 | Miller |
| 6,790,156 | B2 | | 9/2004 | Hösle |
| 6,814,493 | B2 | | 11/2004 | Wobben |
| 2008/0207389 | A1 | | 8/2008 | Fahrenbach et al. |
| 2009/0074337 | A1 | | 3/2009 | Kashchenevsky |
| 2009/0232429 | A1 | | 9/2009 | Stiesdal |

FOREIGN PATENT DOCUMENTS

| | | |
|---|---|---|
| CN | 1904400 | 1/2007 |
| DE | 102 55 745 | 6/2004 |
| EP | 0 038 306 | 10/1981 |
| EP | 1 365 147 | 11/2003 |
| EP | 1 367 273 | 12/2003 |

(Continued)

*Primary Examiner* — Thomas R Hannon
(74) *Attorney, Agent, or Firm* — Wood, Herron & Evans, L.L.P.

(57) ABSTRACT

A plain bearing assembly for a wind turbine includes a bearing housing having a passageway configured to receive a shaft and a bearing surface defining the passageway and having a cylindrical configuration. The bearing surface includes lower and upper portions defined relative to a first midline plane and first and second sides defined relative to a second midline plane. A plurality of fluid cavities is in the bearing surface, wherein at least one fluid cavity is located in the lower portion and at least one fluid cavity is located in the upper portion. The at least one cavity in the lower portion includes first and second pairs of longitudinally spaced fluid cavities on the first and second sides of the bearing surface respectively. A wind turbine having such a plain bearing assembly is also disclosed.

15 Claims, 14 Drawing Sheets

FOREIGN PATENT DOCUMENTS

| | | |
|---|---|---|
| EP | 1 538 332 | 6/2005 |
| EP | 1 544 504 | 8/2009 |
| EP | 2 189 672 | 5/2010 |
| GB | 1 488 120 | 10/1977 |
| GB | 2 273 746 | 6/1994 |
| SU | 1320550 | 6/1987 |
| WO | 20081052525 | 5/2008 |
| WO | 20081113318 | 9/2008 |
| WO | 2010/035011 | 4/2010 |
| WO | 2011/003482 | 1/2011 |

* cited by examiner

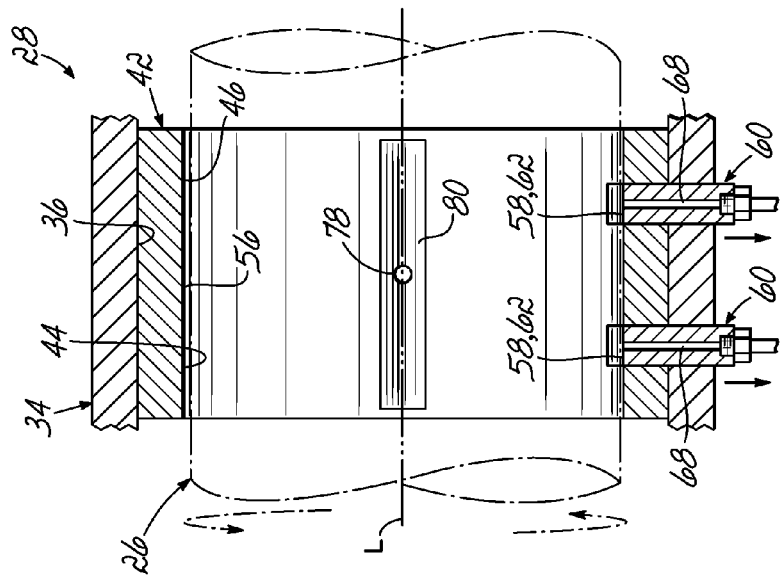
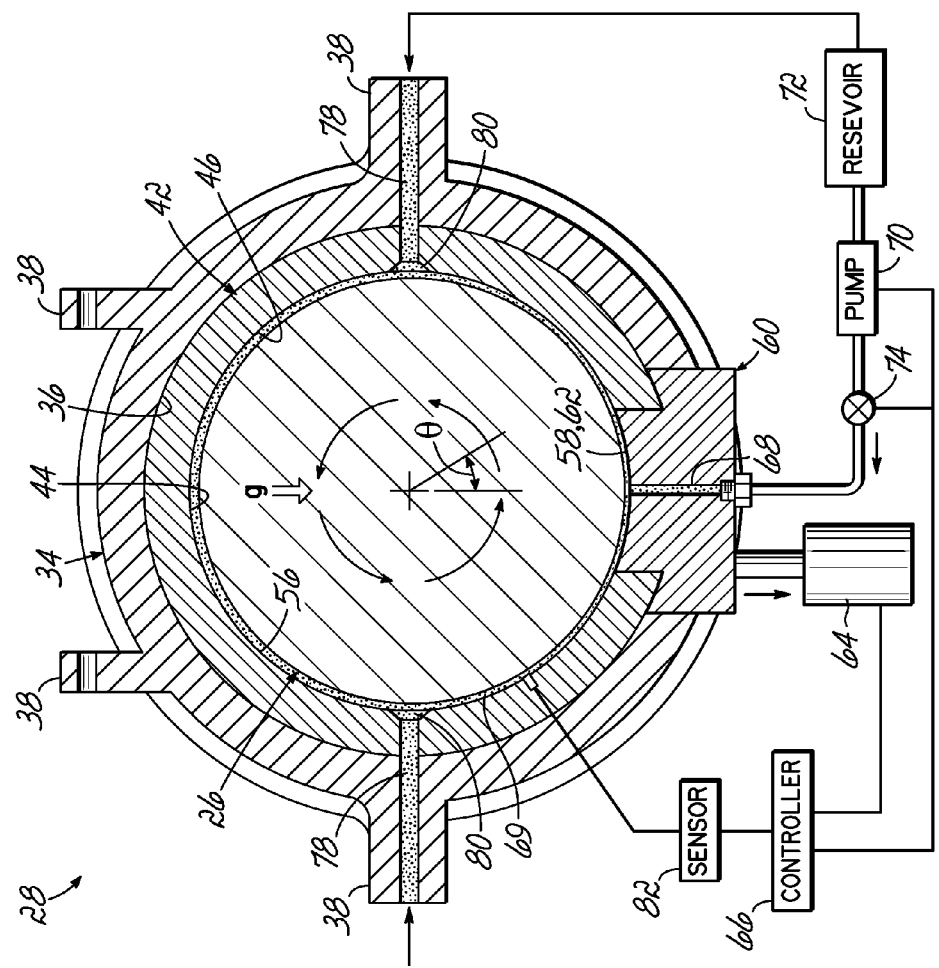
FIG. 4A
FIG. 4B

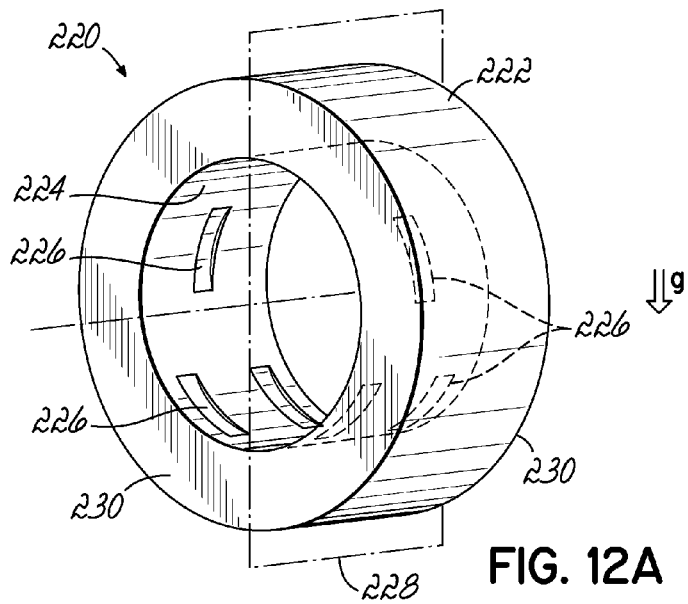
FIG. 12A
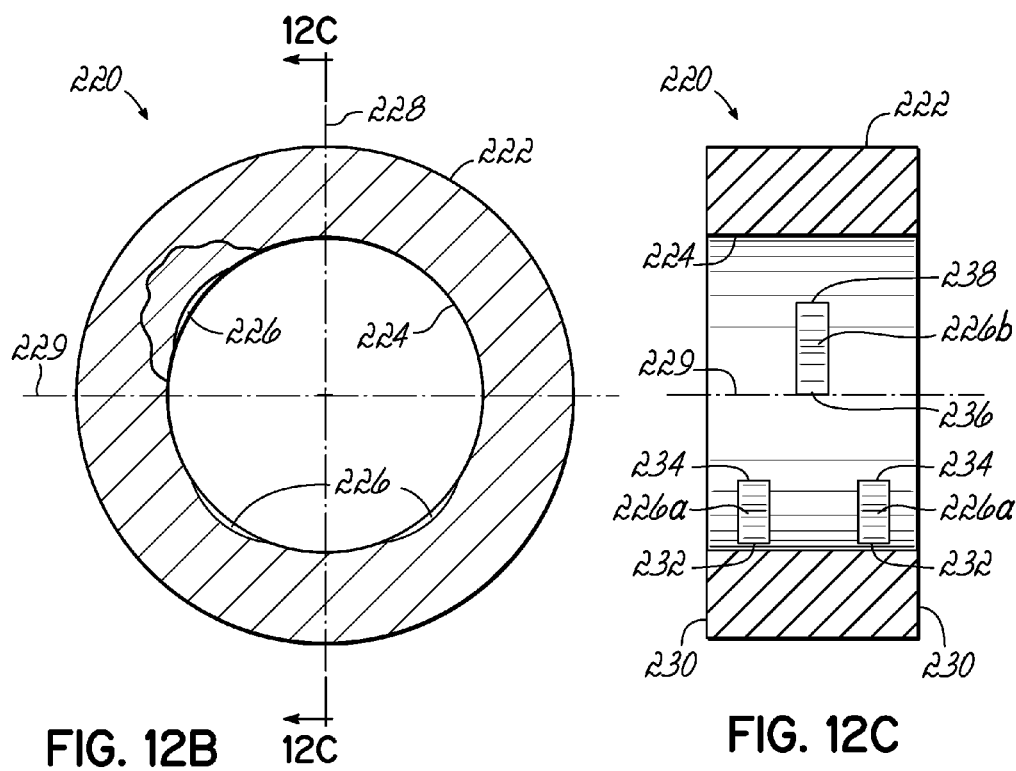
FIG. 12B
FIG. 12C

CYLINDRICAL PLAIN BEARING POCKET ARRANGEMENT AND WIND TURBINE HAVING SUCH A CYLINDRICAL PLAIN BEARING

CROSS-REFERENCE TO RELATED APPLICATIONS

This application is a continuation of co-pending U.S. patent application Ser. No. 12/883,695, filed Sep. 16, 2010. This application is also a continuation of co-pending U.S. patent application Ser. No. 12/883,702, filed Sep. 16, 2010. Each of these applications is incorporated by reference herein in its entirety.

TECHNICAL FIELD

This application relates generally to wind turbines and, more particularly, to a plain bearing for a wind turbine.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled either directly or indirectly with a generator, which is housed inside the nacelle.

A typical modern wind turbine has many moving parts that facilitate converting the kinetic energy of the wind into electrical energy. As such, a wind turbine typically includes many bearings that provide relative movement between adjacent parts in a relatively efficient, low-friction manner. For example, in most wind turbines a "main shaft" extends from the rotor and into the nacelle and is supported by one or more "main bearings." Additionally, the gearbox in the nacelle that steps up the angular speed of the main shaft includes several bearings. Furthermore, the yaw control system that rotates the nacelle relative to the tower to turn the rotor into/out of the wind, and the pitch control system that rotates the blades about their longitudinal axis also include various bearings that allow for enhanced operation of the wind turbine.

Conventionally, these bearings are configured as roller element bearings characterized by having a structural element (e.g., a ball bearing) disposed between the two components which are moving relative to one another. Roller element bearings fail for any number of reasons, but ultimately their life is limited by surface fatigue and wear. Such limited-life components require regular maintenance so as to avoid larger scale failure modes. The replacement parts and maintenance for such limited-life components increase the overall costs of operating a wind turbine. Accordingly, wind turbine and bearing manufacturers strive for improved or alternate designs that extend the operating life of the bearings.

Plain bearings are generally known in the art as having a long operating life. The main reason for this is that, unlike roller element bearings, plain bearings do not have any structural element disposed between the two relative moving components, but instead have only a fluid film disposed therebetween. Thus, the wear and fatigue issues associated with roller elements, as well as the costs associated with their replacement and maintenance, may be avoided. Consequently, plain bearings appear to provide an attractive alternative to roller element bearings. Additionally, plain bearings are designed to eliminate surface-to-surface contact and thus operate with even lower friction, which may further increase efficiency.

There are two primary types of plain bearings for supporting shafts: hydrostatic bearings and hydrodynamic bearings, each typically having a rigid housing with an inner surface opening (the bearing) closely fitted around the shaft (the journal) and a fluid film between the journal and the bearing. In a hydrodynamic bearing, the rotation of the journal self-pressurizes the fluid film in a wedge between confronting journal and bearing surfaces so as to support the load and maintain the journal separate from the bearing. Hydrostatic bearings, on the other hand, include an external pump that pressurizes the fluid film around the journal (independent of the shaft dynamics) to support the load and maintain the journal separate from the bearing. These bearings, while having certain desirable attributes, also have certain drawbacks that have made their implementation within the wind turbine industry rather limited.

In this regard, and in reference to hydrodynamic bearings, unless the journal is rotating with sufficient speed, the fluid film may not be able to fully support the load and maintain the journal separate from the bearing. In this case, the hydrodynamic bearing does not operate in a full-film condition, but instead operates in a boundary condition, wherein the load is partially carried by the fluid film and partially carried by direct surface contact with the bearing. Operating a hydrodynamic bearing in a boundary condition can cause wear or damage that may significantly shorten the operating life of the bearing.

Hydrostatic bearings, on the other hand, are capable of supporting the load even when the journal is rotating slowly or not at all. However, to effectuate external pressurization of the fluid film, hydrostatic bearings include a number of pockets or cavities typically formed in the bearing surface which are supplied with lubricating fluid (e.g., oil, grease, etc.) from an external reservoir and pressurized by an external pump. Hydrostatic bearings, while ensuring sufficient pressurization to support the load and provide separation of the journal and bearing, have reduced operating efficiency as compared to, for example, hydrodynamic bearings. In this regard, the pockets formed in the bearing surface create drag or otherwise affect the film hydrodynamics in a negative manner. This effect becomes pronounced when the journal is rotating at a relatively high speed which would otherwise support the load by the hydrodynamics alone.

Wind turbines rely on the wind and consequently, have a wide operating range, from being in a stand still mode (no rotation of the rotor, main shaft, gears, etc.), to operating at relatively low angular velocities of the various shafts and mechanisms under, for example, low wind conditions, and to operating at relatively high angular velocities under, for example, high wind conditions. Due to the unpredictability of the wind, start-up and shut-downs that occur with wind turbines, and the resultant range of operating conditions, manufacturers have traditionally relied on roller element bearings in wind turbine designs.

While roller element bearings are adequate for their intended purpose, manufacturers continually strive to improve the design, operating costs, and functionality of wind turbines. To this end, it would be desirable to utilize plain bearings instead of roller element bearings in wind turbine designs to increase the operating life of the bearings and decrease the costs associated with replacement and maintenance of roller element bearings.

SUMMARY

Embodiments in accordance with the invention address these and other deficiencies in conventional bearings. In this regard, a plain bearing assembly for a wind turbine, which is configured to receive a shaft therein, includes a bearing housing having a passageway configured to receive the shaft and a bearing surface defining the passageway and having a generally cylindrical configuration. The bearing surface includes a lower portion and an upper portion defined relative to a first midline plane extending through a center of the passageway and generally perpendicular to a gravitational field. The bearing surface further includes a first side and a second side defined relative to a second midline plane extending through the center of the passageway and generally parallel to the gravitational field. A plurality of fluid cavities is in the bearing surface, wherein at least one fluid cavity is located in the lower portion of the bearing surface and at least one fluid cavity is located in the upper portion of the bearing surface. The at least one cavity in the lower portion of the bearing surface further comprises a first pair of longitudinally spaced fluid cavities on the first side of the bearing surface and a second pair of longitudinally spaced fluid cavities on the second side of the bearing surface.

In one embodiment, each of the first pair of longitudinally spaced fluid cavities is generally parallel to each other and extends in a generally circumferential direction in a region starting at about 15 degrees and terminating at about 60 degrees. The second pair of longitudinally spaced fluid cavities may be a mirror reflection of the first pair of fluid cavities about the second midline plane. The at least one fluid cavity in the upper portion of the bearing surface may include a first cavity on the first side of the bearing surface and a second fluid cavity on the second side of the bearing surface. The first fluid cavity may extend in a generally circumferential direction in a region starting at about 90 degrees and terminating at about 130 degrees. The second fluid cavity may be a mirror reflection of the first cavity about the second midline plane. The first cavity in the upper portion of the bearing surface may be disposed longitudinally between the first pair of fluid cavities in the lower portion of the bearing assembly.

In one embodiment, the plain bearing assembly may be configured as a convertible plain bearing. Moreover, the plurality of fluid cavities in the bearing surface may be symmetric about the second midline plane but be asymmetric about the first midline plane. Furthermore, the fluid cavities may have a rectangular configuration, a curved or arcuate configuration, a wedge configuration, or a combination of these configurations.

In yet another embodiment, a wind turbine includes a tower, a nacelle located adjacent a top of the tower, a rotor having a hub and a plurality of blades tending therefrom and configured to interact with the wind to rotate the rotor, a main rotary shaft coupled to the rotor and extending within the nacelle, and a main bearing assembly positioned in the nacelle for supporting the shaft therein. The main bearing assembly may include a plain bearing having a bearing housing with a passageway configured to receive the shaft and a bearing surface defining the passageway and having a generally cylindrical configuration. The bearing surface includes a lower portion and an upper portion defined relative to a first midline plane extending through a center of the passageway and generally perpendicular to a gravitational field. The bearing surface further includes a first side and a second side defined relative to a second midline plane extending through the center of the passageway and generally parallel to the gravitational field. A plurality of fluid cavities is in the bearing surface, wherein at least one fluid cavity is located in the lower portion of the bearing surface and at least one fluid cavity is located in the upper portion of the bearing surface. The at least one cavity in the lower portion of the bearing surface further comprises a first pair of longitudinally spaced fluid cavities on the first side of the bearing surface and a second pair of longitudinally spaced fluid cavities on the second side of the bearing surface.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 4A is a cross-sectional view of a convertible main bearing assembly in accordance with one embodiment of the invention in a hydrodynamic operating mode;

FIG. 4B is another cross-sectional view of the convertible main bearing assembly shown in FIG. 4A;

FIG. 12A is a partial perspective view of a cylindrical hydrostatic main bearing assembly for a wind turbine in accordance with another embodiment of the invention;

FIG. 12B is a cross-sectional view of the hydrostatic main bearing assembly of FIG. 12A taken generally along line 12B-12B;

FIG. 12C is a cross-sectional view of the hydrostatic main bearing assembly of FIG. 12B taken generally along line 12C-12C;

DETAILED DESCRIPTION

Figure 1:
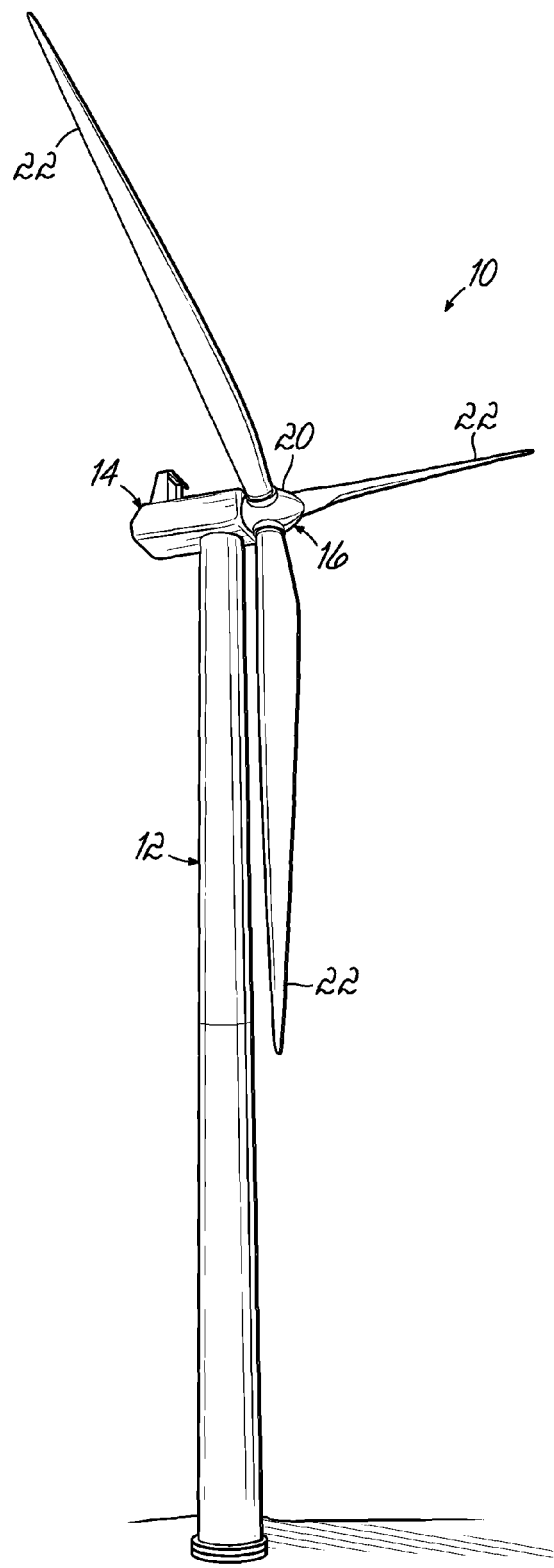
FIG. 1 is a diagrammatic view of a wind turbine.
Figure 2:
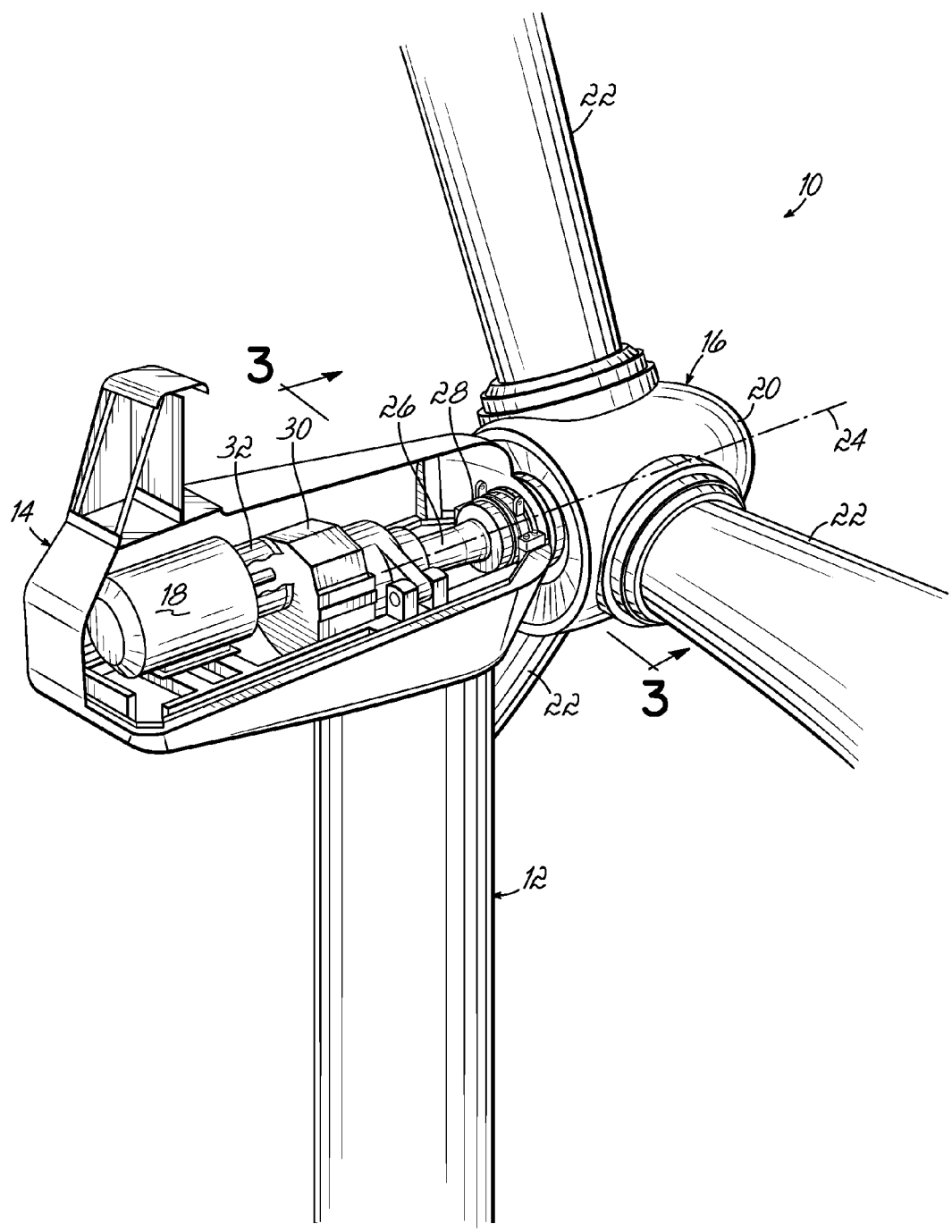
FIG. 2 is a perspective view of a portion of the wind turbine of FIG. 1 in which the nacelle is partially broken away to expose a generator and other structures housed inside the nacelle.
Figure 3:
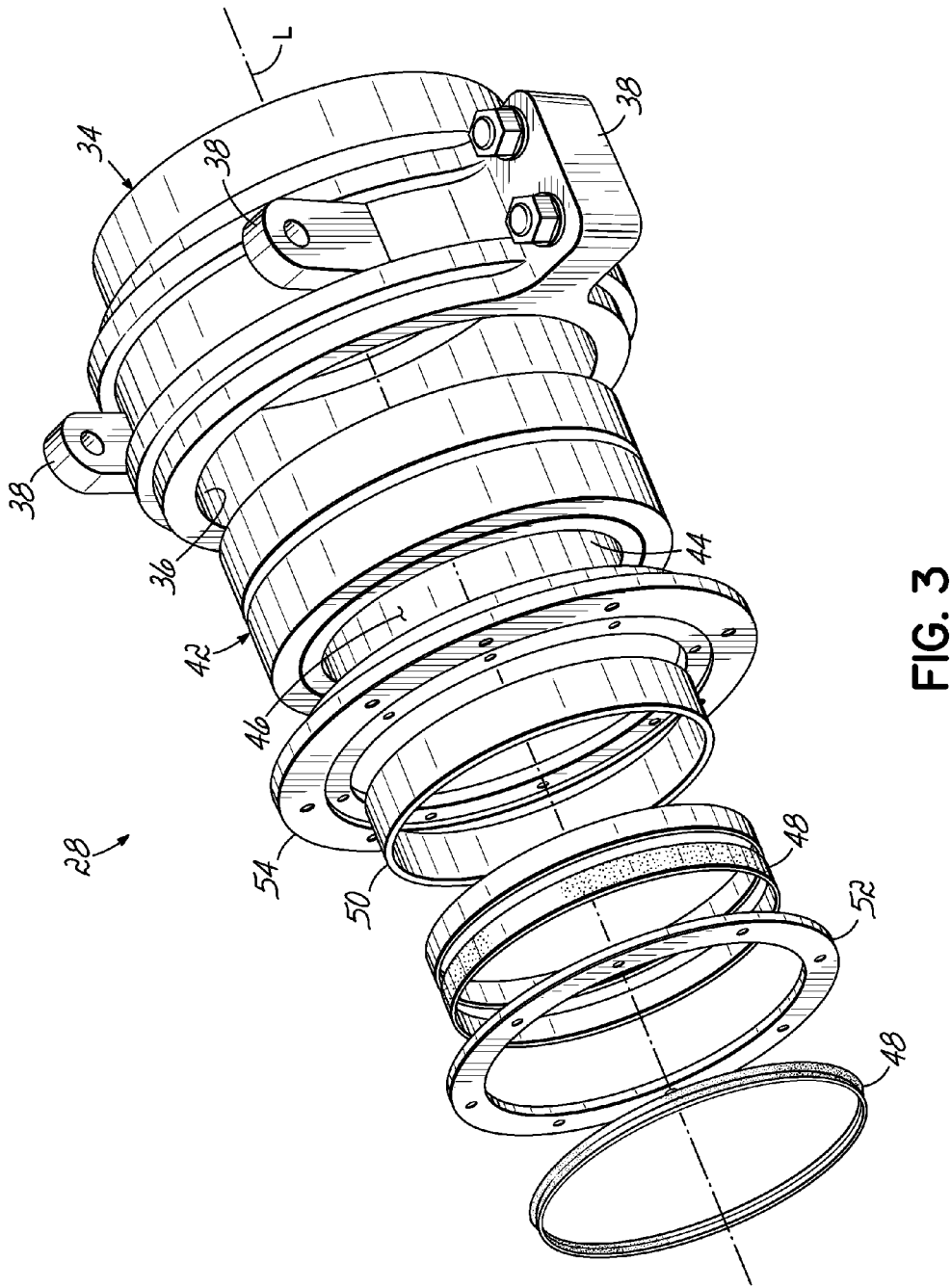
FIG. 3 is a perspective view of a main bearing assembly for a wind turbine.

With reference to FIGS. 1 and 2 and in accordance with an embodiment of the invention, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10, some of which will be discussed in more detail below. The tower 12 supports the load presented by the nacelle 14, the rotor 16, and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 20 and a plurality of blades 22 that project outwardly from the central hub 20 at locations circumferentially distributed thereabout. In the representative embodiment, the rotor 16 includes three blades 22, but the number may vary. The blades 22 are configured to interact with the passing air flow to produce lift that causes the central hub 20 to spin about a longitudinal axis 24. The design and construction of the blades 22 are familiar to a person having ordinary skill in the art and will not be further described.

The rotor 16 is mounted on an end of a main rotary shaft 26 that extends into the nacelle 14 and is rotatably supported therein by a main bearing assembly 28 coupled to the framework of the nacelle 14. The main rotary shaft 26 is coupled to a gearbox 30 having as an input the relatively low angular velocity main rotary shaft 26, and having as an output a higher angular velocity secondary rotary shaft 32 that is operatively coupled to the generator 18.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

In accordance with aspects of the invention, the main bearing assembly 28 is not of the roller element type, which is conventional, but is designed as a plain bearing. More particularly, in one embodiment, the main bearing assembly 28 is characterized as being a convertible plain bearing. Accordingly, the main bearing assembly 28 includes operating modes characterized by both hydrodynamic and hydrostatic plain bearings and may be selectively converted between a hydrodynamic operating mode and a hydrostatic operating mode. The ability to convert between these different operating modes allows the main bearing assembly 28 to take advantage of the benefits offered by hydrodynamic or hydrostatic bearings, while eliminating or minimizing the various drawbacks associated with each of these types of bearings.

To this end, and in reference to FIGS. 3-5B, the main bearing assembly 28 includes a bearing housing or shell 34 having an open passageway 36 therethrough and one or more mounts 38 configured to fixedly secure the main bearing assembly 28 to the framework of the nacelle 14. Passageway 36 is configured to receive a main bearing insert 42 therein that includes a passageway 44 defined by an internal bearing wall or surface 46 configured to closely receive the main rotary shaft 26 therethrough. In alternative embodiments, the main bearing insert 42 may be integrally formed with bearing housing 34 to define bearing surface 46 instead of being a separate component thereof.

Figure 5B:
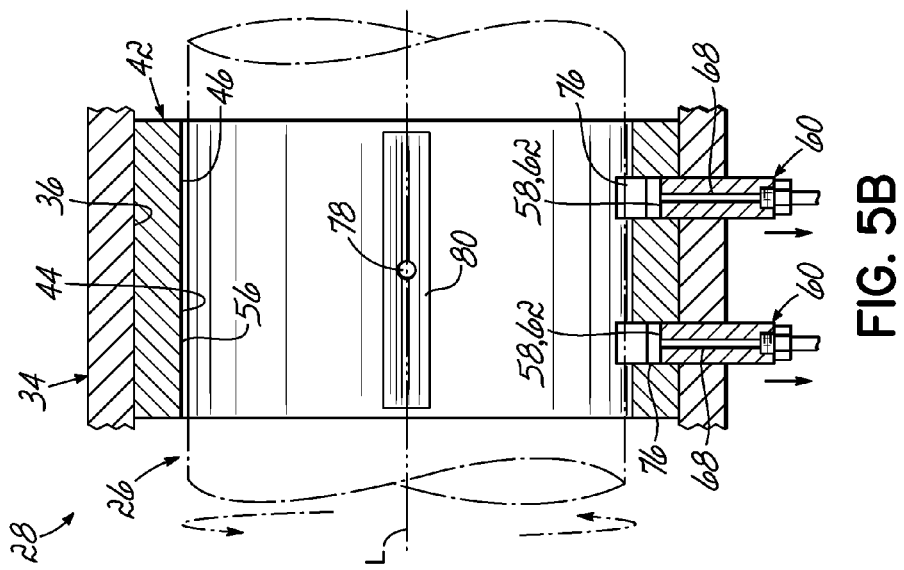
FIG. 5B is another cross-sectional view of the convertible main bearing assembly shown in FIG. 5A.

The main bearing assembly 28 may further include elements, including various seals 48, a seal cap 50, a seal cover 52, a main bearing cover 54, etc, for securing the main bearing insert 42 within the housing 34 and sealing the main bearing assembly 28. In the illustrated embodiment, the main rotary shaft 26 is generally cylindrical with a substantially constant diameter along its longitudinal axis L, and the bearing surface 46 of the main bearing insert 42 has a corresponding configuration (FIGS. 4B and 5B). Therefore, as illustrated, main bearing assembly 28 may be described as a cylindrical plain bearing. As will be explained in greater detail below, however, such a constant diameter, cylindrical configuration is merely exemplary and other configurations are possible.

Figure 5A:
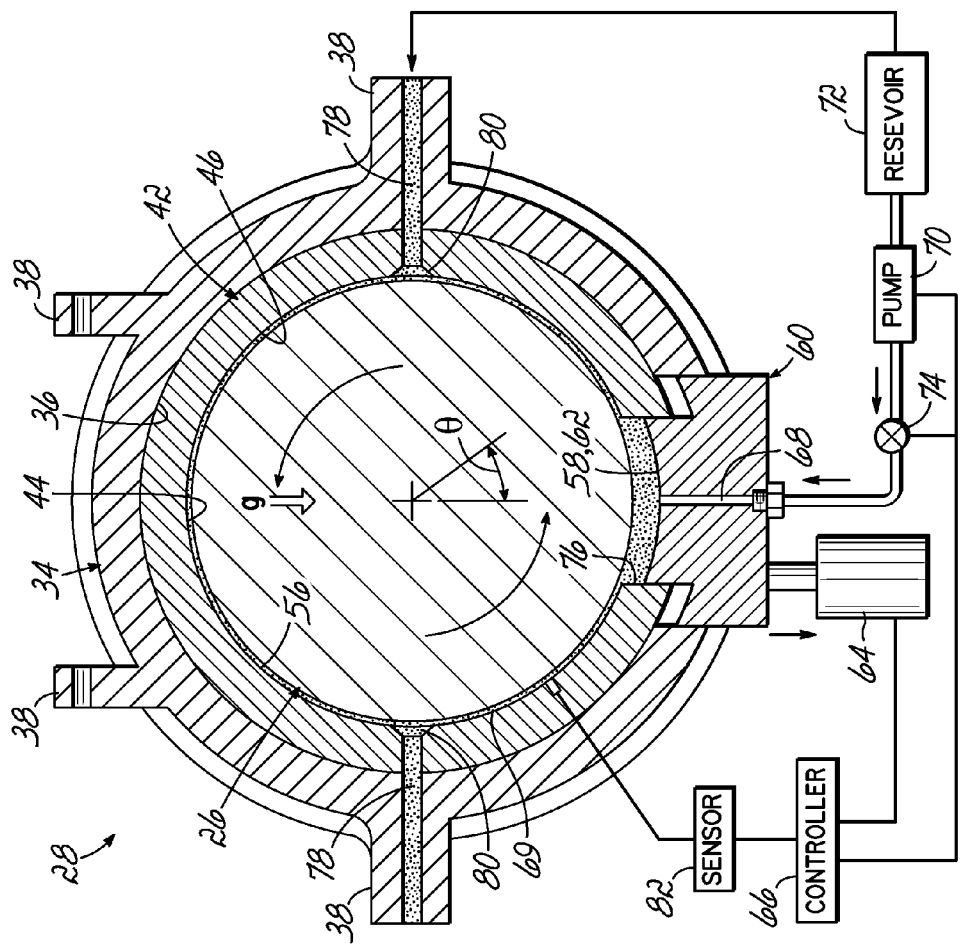
FIG. 5A is a cross-sectional view of the convertible main bearing assembly shown in FIG. 4A in a hydrostatic operating mode.

For purposes of description, it is convenient to define a cylindrical coordinate system at the center of the passageway 44 as viewed in cross section (FIGS. 4A and 5A). In regard to angular position θ, the zero angle reference aligns with the gravitational field g (downward in the view of FIGS. 4A and 5A) and increases in the counterclockwise direction. The coordinate system is merely to facilitate a fuller understanding of the invention and the invention should not be limited to any particular orientation or reference frame. Those of ordinary skill in the art will understand and appreciate aspects of the invention independent of the orientation and reference frame.

As illustrated in FIGS. 4A-5B, the bearing surface 46 is configured to define a stationary bearing surface portion 56 and a movable bearing surface portion 58 capable of moving relative to the stationary bearing surface portion 56 between various positions. In one embodiment, the main bearing insert 42 includes at least one movable member, which may take the form of a slide 60, that is selectively movable relative to a remainder portion of the main bearing insert 42 and includes an inner surface 62 that forms part of the bearing surface 46 that confronts the main rotary shaft 26 (e.g., inner surface 62 defines the movable bearing surface portion 58). The inner surface 62 of slide 60 has a shape that cooperates with the stationary bearing surface portion 56 to provide the overall desired shape of the bearing surface 46 (again, which is typically dictated by the shape of the main rotary shaft 26). Thus, in one embodiment, the inner surface 62 takes the form of a substantially constant diameter cylindrical surface portion (i.e., a circular arc in the cross section shown in FIG. 4A and linear in the cross section shown in FIG. 4B).

As shown in FIG. 4B, main bearing insert 42 may include a plurality of slides 60 incorporated within the main bearing insert 42, each of which forms a portion of the bearing surface 46. By way of example, two slides 60 may be positioned at zero degrees (e.g., in a lower portion of the main bearing insert 42 as viewed in FIGS. 4A and 4B) and spaced apart in the longitudinal direction. The number of slides 60 and the positioning thereof within the main bearing insert 42, however, may vary depending on the specific application and desires of the bearing manufacturer and should not be limited to the particular number or positions shown herein. Each of the slides 60 may be similar in construction and operation. Accordingly, a detailed description of one of the slides 60 should suffice as a sufficient description of the remaining slides 60.

In a particularly advantageous aspect of the invention, the slide 60 is movable in a generally radial direction between a first position and a second position. In this regard, the slide 60 may be operatively coupled to an actuator, schematically shown at 64 (FIGS. 4A and 5A), for moving the slide 60 between the first and second positions. For example, the actuator 64 may be in the form of an electric, pneumatic, or hydraulic actuator. Other actuators known to those of ordinary skill in the art may also be utilized to move the slide 60 between its various end and intermediate positions. The actuator 64 may, in turn, be operatively coupled to a controller, schematically shown at 66, for controlling the actuator 64. The controller 66 may be an individual controller dedicated to controlling the movement of actuator 64 and therefore slide 60. Alternatively, the controller 66 may be part of a larger control system for controlling the overall operation of the wind turbine 10.

Slide 60 includes at least one port 68 open to the inner surface 62 of the slide 60. Port 68 operates as a high pressure port for introducing fluid to the main bearing assembly 28 and pressurizing the fluid film 69 (exaggerated in the figures for illustrative purposes) when the main bearing assembly 28 is operating in a hydrostatic mode, as will be further explained below. In this regard, the at least one fluid port 68 may be operatively coupled to a pump, schematically shown at 70, configured to pressurize the fluid film 69. The pump 70 should be rated so as to sufficiently pressurize the fluid film 69 to a level that supports the load on the main rotary shaft 26 in a worst case scenario, such as for example a stand still condition or other high load dynamic conditions.

The pump 70 may be operatively coupled to a reservoir 72 for providing a supply of the fluid that forms the fluid film 69 between the bearing surface 46 and the main rotary shaft 26 during operation. As illustrated in the figure, the pump 70 may be operatively coupled to the controller 66 for controlling the operation of the pump 70. A valve, shown schematically at 74, may be disposed in the line coupling the high pressure port 68 and the pump 70 so as to selectively isolate the fluid film 69 in the main bearing assembly 28 from the pump 70. The valve 74 may be operatively coupled to the controller 66 for selectively opening and closing the valve 74.

It should be recognized that when the main bearing assembly 28 includes a plurality of slides 60, each slide 60 may be operatively coupled to its own dedicated pump 70, reservoir 72, and valve 74. Alternatively, each slide 60 may collectively be operatively coupled to a single pump 70, reservoir 72, and valve 74. Additionally, the slides 60 may be individually or collectively controlled by controller 66.

In one embodiment, the main bearing assembly 28 is configured to operate in a plurality of modes depending on the dynamic condition of the wind turbine 10. More particularly, the main bearing assembly 28 is configured to operate in a hydrostatic mode when dynamic conditions of the wind turbine 10 are relatively small, and operate in a hydrodynamic mode when dynamic conditions of the wind turbine 10 are relatively high. As will be explained in further detail below, such a transitioning between the modes of operation is a result of moving the slide 60 between the first and second positions.

During relatively low dynamic conditions, which might occur, for example, during start-up of the wind turbine 10, shut-down of the wind turbine 10, or low wind conditions that might periodically occur during operation of the wind turbine 10, the hydrodynamic forces in the fluid film 69 between the bearing surface 46 and the main rotary shaft 26 may be insufficient to support the load on main rotary shaft 26. Consequently, during these conditions, the main bearing assembly 28 may be configured to be in a hydrostatic mode of operation.

As illustrated in FIGS. 5A and 5B, in the hydrostatic mode of operation, the movable bearing surface portion 58 is configured to be displaced radially outward relative to the stationary bearing surface portion 56 so as to form a fluid pocket or cavity 76 in the bearing surface 46. In an exemplary embodiment, this is achieved by positioning the slide 60 in its first, retracted position wherein the inner surface 62 thereof is spaced radially outward of the stationary bearing surface portion 56 to form fluid pocket 76. It should be recognized that the inner surface 62 of slide 60 effectively forms a movable bottom wall of cavity 76. In addition, the valve 74 may be placed in the opened position and the pump 70 is activated so that the pump 70 is in fluid communication with the fluid film 69 between the bearing surface 46 and the main rotary shaft 26 to pressurize the fluid film 69. As explained above, due to this external pressurization, the fluid film 69 is capable of supporting the load on the main rotary shaft 26 independent of the hydrodynamic forces, if any, developed in the fluid film 69. Consequently, surface-to-surface contact that might otherwise occur between the bearing surface 46 and the main rotary shaft 26 during such low dynamic conditions may be avoided.

During relatively high dynamic conditions, which might occur, for example, when the wind conditions are sufficiently high that the rotor 16, and thus main rotary shaft 26, rotates at an angular velocity at or above some threshold value, the hydrodynamic forces in the fluid film 69 are sufficient to support the load on the main rotary shaft 26. Consequently, during these conditions, the main bearing assembly 28 may be configured to be in a hydrodynamic mode of operation.

As illustrated in FIGS. 4A and 4B in the hydrodynamic mode of operation, the movable bearing surface portion 58 is configured to be aligned with or flush with the stationary bearing surface portion 56 so that the bearing surface 46 presents a substantially smooth topology. In an exemplary embodiment, this is achieved by positioning the slide 60 in its second, aligned position wherein the inner surface 62 thereof is substantially flush with the stationary bearing surface portion 56. In this regard, the actuator 64 may be activated, such as via controller 66, to move the slide 60 from its retracted position to its aligned position. In other words, the bottom wall of the fluid cavity 76 is moved so as to effectively eliminate cavity formation within the bearing surface 46. In addition, the valve 74 may be placed in the closed position to isolate the pump 70 from the fluid film 69 so that the pump 70 does not otherwise affect the hydrodynamics of the fluid film 69.

Moreover, the main bearing insert 42 may include at least one port 78 open to the bearing surface 46 and positioned in the stationary bearing surface portion 56 thereof. For example, in one embodiment, stationary bearing surface portion 56 may include a shallow, longitudinally-directed groove 80 in communication with port 78. It should be recognized that the depth of groove 80 is relatively small so as not to significantly affect the hydrodynamic performance of main bearing assembly 28 when operating in a hydrodynamic mode. Port 78 is operatively coupled to a reservoir, such as reservoir 72, although a separate reservoir may be provided, and operates as a low pressure port for introducing fluid to the main bearing assembly 28 when operating in the hydrodynamic mode. The number and positioning of grooves 80/ports 78 may vary depending on the specific application and desires of the bearing manufacturer. In one embodiment and without limitation, grooves 80 having ports 78 may be formed in the bearing surface 46 at approximately 90° and approximately 270°, as seen in FIGS. 4A and 5A.

As explained above, due to hydrodynamic forces developed in the fluid film 69, the fluid film 69 is capable of supporting the load on the main rotary shaft 26 independent of external pressurization. Consequently, surface-to-surface contact between the bearing surface 46 and the main rotary shaft 26 during high dynamic conditions may be avoided as well. Additionally, however, because the fluid cavity 76 has effectively been eliminated and the bearing surface 46 has a substantially smooth topology, the main bearing assembly 28 displays the efficient, high-load capacity behavior of conventional hydrodynamic bearings.

If the wind turbine 10 starts transitioning from a high dynamic condition to a low dynamic condition (e.g., shutdown, low wind conditions, etc.), the operating mode of the main bearing assembly 28 may be converted back to the hydrostatic operating mode. For example, if the angular velocity of the main rotary shaft 26 falls below the threshold value, the main bearing assembly 28 may be configured to transition back to the hydrostatic operating mode. In this regard, the movable bearing surface portion 58 may be configured to once again be displaced radially outward relative to the stationary bearing surface portion 56 so as to form the fluid cavity 76 in the bearing surface 46. This may be achieved by activating actuator 64 so as to move the slide 60 from the second, aligned position to the first, retracted position such that the inner surface 62 thereof is spaced radially outward of the stationary bearing surface portion 56 to form fluid cavity 76. Moreover, the valve 74 may be placed in the opened position and the pump 70 activated so that the pump 70 is in fluid communication with the fluid film 69 between the bearing surface 46 and the main rotary shaft 26 to pressurize the fluid film 69.

It should be recognized that transitioning between the various modes of operation may be automated through controller 66. For example, a sensor, shown schematically at 82, may be operatively coupled to main rotary shaft 26 and controller 66, and configured to monitor the dynamic state of the main rotary shaft 26. In one embodiment, for example, the sensor 82 may monitor the angular velocity of the main rotary shaft 26. The sensor 82 may be further configured to send a signal to controller 66 indicative of the measured angular velocity.

Such a sensor 82 is generally known in the art and commercially available. Accordingly, a further description of sensor 82 is deemed unnecessary. The controller 66 can have preprogrammed therein the threshold angular velocity at which the main bearing assembly 28 is configured to transition between the hydrostatic and hydrodynamic operating modes. It should be appreciated that the threshold value depends on several factors, including size of the wind turbine 10, type of fluid lubricant used in the plain bearing, and other factors. In any event, one of ordinary skill in the art will recognize how to determine the threshold angular velocity for the particular wind turbine and system.

If the measured angular velocity of the main rotary shaft 26, as indicated by sensor 82, is at or above the threshold value, then the main bearing assembly 28 may be configured to operate in a hydrodynamic operating mode in accordance with that described above. More particularly, the controller 66 may activate actuator 64, valve 74, and/or pump 70, as needed, to transition to the hydrodynamic operating mode. If, however, the measured angular velocity of the main rotary shaft 26 is below the threshold value, then the main bearing assembly 28 may be configured to operate in a hydrostatic operating mode in accordance with that described above. Again, the controller 66 may activate actuator 64, valve 74, and/or pump 70, as needed, to transition to the hydrostatic operating mode. Although in the exemplary embodiment described herein the angular velocity of the main rotary shaft 26 is used as the criteria for transitioning between the hydrostatic and hydrodynamic operating modes, the invention is not so limited as other or additional parameters may be used for defining a criteria at which the transition between operating modes is initiated.

Figure 6:
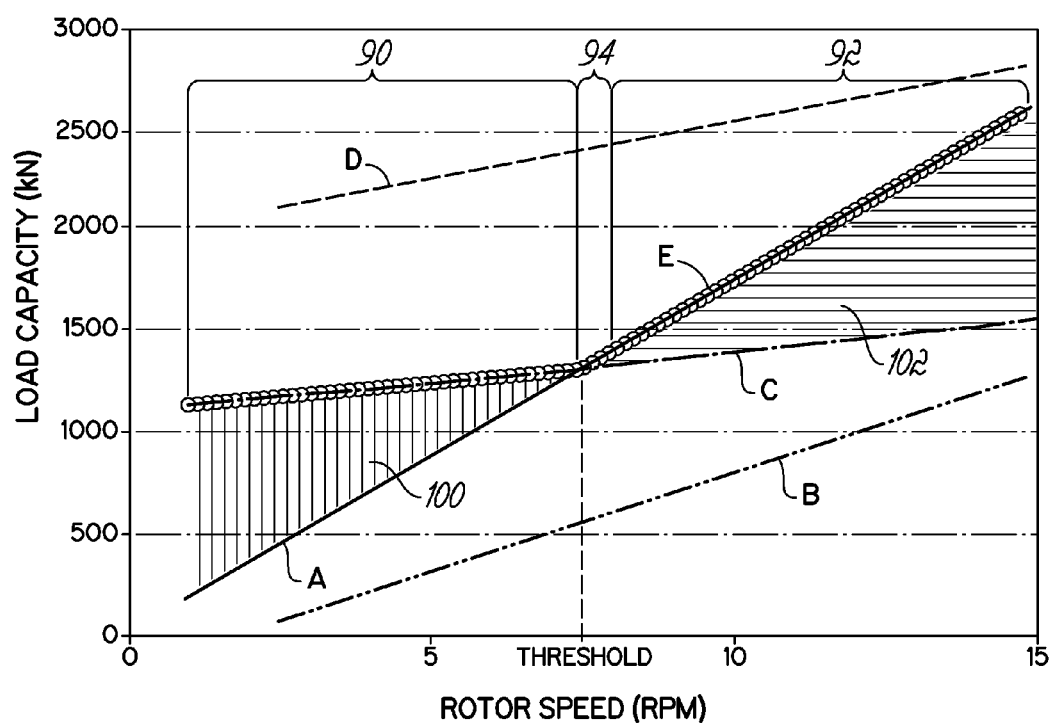
FIG. 6 is a diagrammatic illustration of performance of hydrostatic bearings, hydrodynamic bearings, and a convertible bearing in accordance with embodiments of the invention.

Operation of the main bearing assembly 28, and the benefits afforded by the convertible design of the plain bearing is schematically illustrated in FIG. 6, which generally correlates the load capacity of a plain bearing as a function of the angular velocity of the shaft. In this regard, curve A is believed to be characteristic of the relationship for an ideal bearing surface (i.e., no fluid cavities and substantially smooth topology of bearing surface) operating in a hydrodynamic mode with no external pressurization. As such, this curve represents such a plain bearing operating at its optimal efficiency. Curve B is believed to be characteristic of the relationship for a bearing surface having fluid cavities, but no external pressurization (i.e., not in fluid communication with the pump so as to pressurize the fluid film). A comparison between curves A and B demonstrates the negative impact of cavity formation in the bearing surface on the performance of the plain bearing. In other words, the formation of fluid cavities in the bearing surface disrupts the development of hydrodynamic forces which results in a significant reduction in the load capacity of the plain bearing. These two curves demonstrate why it may be undesirable to use a bearing with fluid cavities when the bearing is operating in a regime which would otherwise support a hydrodynamic bearing.

Curve C is believed to be characteristic of the relationship for a bearing surface having fluid cavities and having some level of external pressurization (i.e., the fluid film is in fluid communication with the pump and being pressurized thereby). Comparing curves B and C, it is clear that the load capacity of the bearing has been increased due to the pressurization from the pump. However, the slope of curve C remains relatively low, indicating that the cavity formation and pressurization thereof negatively impacts the development of hydrodynamic forces that would otherwise aid in supporting the load (e.g., compare curves A and C at higher rotor speeds). Additionally, the slope of curve C may be even less than that of curve B, indicating that the effects of pressurization (as opposed to just cavity formation) may further negatively impact the development of hydrodynamic forces that would otherwise aid in supporting the load.

Curve D is believed to be characteristic of the relationship for a bearing surface having fluid cavities and having a level of external pressurization greater than that for curve C. Thus, the load capacity of the bearing has been increased due to the increased pressurization of the fluid film by the pump. However, the amount of energy and fluid required for the high level of external pressurization associated with curve D makes such a solution impractical. Moreover, somewhat characteristic of hydrostatic bearings, the slope of curve D remains relatively low and may be similar to the slope for curve C indicating, for example, that the affect of pressurization of the fluid cavities on the hydrodynamics may lessen for increasing pressurization.

In contrast to these curves, curve E is believed to be characteristic of the relationship for a convertible bearing in accordance with aspects of the invention (and operating with an external pressurization in the hydrostatic mode used in curve C, for example). Curve E clearly demonstrates a hydrostatic region 90, a hydrodynamic region 92, and a transition region 94. In the hydrostatic region 90, curve E has a relatively small slope characteristic of hydrostatic operation (generally following curve C), but has a load capacity greater than that which would be achieved by a bearing optimized for hydrodynamic conditions (curve A; no fluid cavities). In the hydrodynamic region 92, curve E has a relatively large slope characteristic of hydrodynamic operation (generally following curve A) and has a load capacity greater than that which would be achieved under hydrostatic conditions (curve C). The transition region 94, which is located approximately about the threshold angular velocity, is characterized by the slope of curve E changing relatively quickly as the plain bearing changes its mode of operation. While the curve in this region is illustrated as a relatively sharp corner, it should be recognized that the curve may be more smooth and arcuate depending on how quickly the transition is made between operating modes, for example.

In FIG. 6, region 100 represents the benefits of operating a plain bearing in a hydrostatic mode (with fluid cavities) instead of a hydrodynamic mode (without fluid cavities) for low dynamic conditions. Similarly, region 102 represents the benefits of operating a plain bearing in a hydrodynamic mode instead of a hydrostatic mode for high dynamic conditions. The main bearing assembly 28 may therefore take advantage of both of these beneficial regions 100, 102 illustrated in FIG. 6 as a result of its capacity to transition between hydrostatic and hydrodynamic operating modes. Consequently, the main bearing assembly 28 is capable of operating at optimal efficiency during high dynamic conditions and is further capable of avoiding wear and other damage at low dynamic conditions. As a result, the convertible design as disclosed herein represents an improved design expected to prolong the operating life of main bearing assembly 28 and therefore reduce the overall operating costs (e.g., replacement costs, maintenance costs, etc.) of wind turbine 10.

While the main bearing assembly 28 illustrated and described above is directed to a cylindrical bearing design, i.e., the bearing surface 46 and the main rotary shaft 26 have corresponding, confronting constant diameter cylindrical configurations, the invention is not so limited. In an alternative embodiment, the main bearing assembly may be configured as a spherical plain bearing. A spherical plain bearing may have additional benefits as compared to cylindrical plain bearings. In this regard, for example, cylindrical bearings, whether it be roller element bearings or plain bearings, generally require relatively precise alignment of the shaft through the passageway defined by the bearing surface and are not sufficiently robust in their design to accommodate shaft misalignments. Shaft misalignments may cause the bearing to wear more quickly. Due to the symmetries in spherical configurations, however, spherical bearings, such as spherical roller element bearings, are capable of accommodating some degree of misalignment of the shaft through the bearing. The symmetries afforded by spherical geometries may be implemented in embodiments of the present invention to similarly provide a degree of robustness in regard to alignment of the main rotary shaft through the main bearing assembly. Such a spherical design may also provide other benefits, as will be discussed in more detail below.

Figure 7:
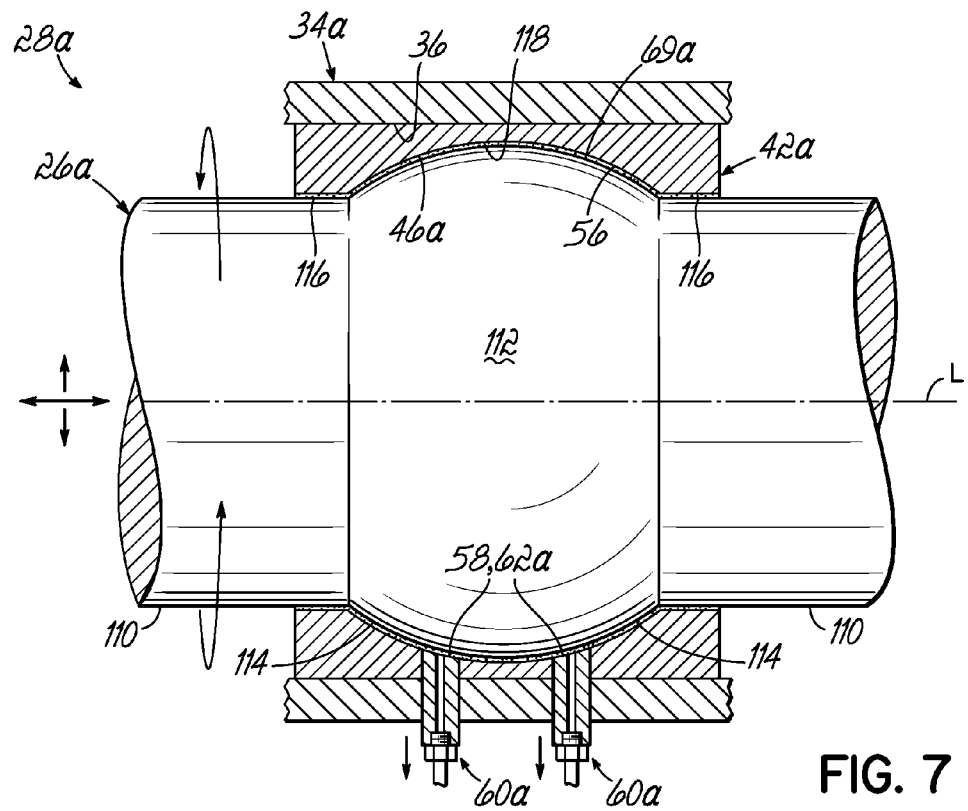
FIG. 7 is a partial cross-sectional view of a convertible main bearing assembly in accordance with another embodiment of the invention in a hydrodynamic operating mode.

To this end, and in reference to FIG. 7, in which like reference numerals refer to like features in FIGS. 3-5B, main bearing assembly 28a may be configured as a spherical plain bearing. In this embodiment, the main rotary shaft 26a includes generally cylindrical, constant diameter sections 110 coupled to opposed sides of an intermediate generally spherical section 112. The main rotary shaft 26a may be a unitary shaft (e.g., machined or otherwise processed to have a monolithic configuration). Alternatively, the main rotary shaft 26a may be formed from separate components which are subsequently coupled through a suitable process (e.g., welding) to have the noted configuration. The spherical section 112 is generally larger than the cylindrical sections 110 so as to generally define annular shoulders 114. The bearing surface 46a, which may be formed in a bearing insert 42a or alternatively integrally formed with the bearing housing 34a, has a generally corresponding configuration. In this regard, the bearing surface 46a includes generally cylindrical, constant diameter surface portions 116 configured to confront cylindrical sections 110 of main rotary shaft 26a, and an intermediate spherical surface portion 118 configured to confront spherical section 112. As such, the spherical surface portion 118 is located generally radially outward of the cylindrical surface portions 116 such that the shoulders 114 confront a portion of spherical surface portion 118.

In an exemplary embodiment, main bearing assembly 28a may be selectively convertible between hydrostatic and hydrodynamic operating modes similar to that explained above. Thus, bearing surface 46a may include a stationary bearing surface portion 56 and a movable bearing surface portion 58, which may, for example, be defined by one or more slides 60a (two shown) having an inner surface 62a. In the exemplary embodiment, the slides 60a are positioned along the spherical surface portion 118. However, it should be recognized that the number of slides 60a and the positioning thereof in the bearing surface 46a may vary depending on the specific application and desires of the bearing manufacturer and should not be limited to the particular number or positions shown herein. As one of ordinary skill in the art will readily appreciate the operation of slide(s) 60a and the operation of main bearing assembly 28a in the hydrostatic and hydrodynamic operating modes based on the above description of the cylindrical plain bearing, a more thorough description of the spherical plain bearing is deemed unnecessary for a full and complete understanding of this embodiment. It is recognized, however, that the main bearing assembly 28a will benefit from the convertible aspect similar to that described above.

In addition to being able to accommodate shaft misalignments, the spherical plain bearing may provide additional benefits. In this regard, it should be realized that cylindrical plain bearings are capable of accommodating radial loads on the shaft, but are generally incapable of accommodating axial or longitudinal loading of the shaft. Accordingly, a second, separate mechanism is typically used to withstand or accommodate the longitudinal loading of the shaft. In contrast to this, however, a spherical plain bearing is generally capable of accommodating both radial and longitudinal loading of the shaft. In the instant case, main bearing assembly 28a is generally capable of accommodating both radial and longitudinal loading of the main rotary shaft 26a. More particularly, longitudinal loading on the main rotary shaft 26a is supported by the fluid film 69a between the shoulders 114 and corresponding portions of bearing surface 46a confronting shoulders 114. Thus, in this embodiment, the fluid film 69a supports both radial and longitudinal loading of main rotary shaft 26a and separate mechanisms for accommodating the longitudinal loads may not be needed.

Figure 8:
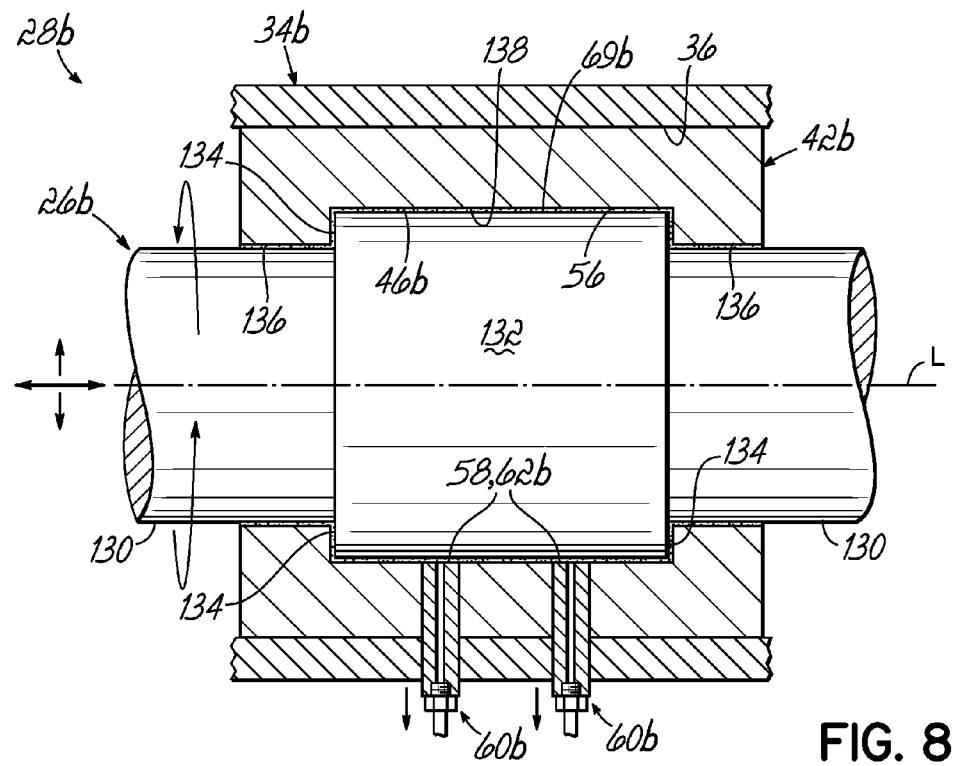
FIG. 8 is a partial cross-sectional view of a convertible main bearing assembly in accordance with yet another embodiment of the invention in a hydrodynamic operating mode.

The ability to accommodate both radial and longitudinal loading of the main rotary shaft is not limited to the main bearing assembly being configured as a spherical plain bearing, as described above. Other configurations are also possible. In this regard, FIG. 8 is a cross-sectional view of a main bearing assembly 28b in accordance with yet another embodiment of the invention. In this embodiment, the main bearing assembly 28b may be configured as a cylindrical plain bearing, but with a modification that accommodates longitudinal loading of the main rotary shaft 26b as well as radial loading.

To this end, the main rotary shaft 26b includes generally cylindrical, constant diameter sections 130 coupled to opposed sides of an intermediate cylindrical, constant diameter section 132. The rotary shaft 26b may be a unitary shaft or be formed from separate components which are subsequently coupled through a suitable process so as to have the noted configuration. The diameter of the intermediate cylindrical section 132 is generally larger than the diameter of cylindrical sections 130 so as to generally define a pair of opposed generally planar, annular abutment surfaces 134. The bearing surface 46b, which may be formed in a bearing insert 42b or alternatively integrally formed with the bearing housing 34b, has a generally corresponding configuration. In this regard, the bearing surface 46b includes generally cylindrical, constant diameter surface portions 136 configured to confront cylindrical sections 130 of main rotary shaft 26b, and an intermediate cylindrical surface portion 138 configured to confront intermediate cylindrical section 132. The intermediate cylindrical surface portion 138 is located generally radially outward of the cylindrical surface portions 136 such that the abutment surfaces 134 confront a portion of the intermediate surface portion 138.

In an exemplary embodiment, main bearing assembly 28b may be selectively convertible between hydrostatic and hydrodynamic operating modes similar to that explained above. Thus, bearing surface 46b may include a stationary bearing surface portion 56 and a movable bearing surface portion 58, which may, for example, be defined by one or more slides 60b (two shown) having an inner surface 62b. In the exemplary embodiment, the slide(s) 60b may be positioned along the intermediate cylindrical surface portion 138. However, it should be recognized that the number of slides 60b and the positioning thereof in the bearing surface 46b may vary depending on the specific application and desires of the bearing manufacturer and should not be limited to the particular number or positions shown herein. As one of ordinary skill in the art will readily appreciate the operation of slide(s) 60b and the operation of main bearing assembly 28b in the hydrostatic and hydrodynamic operating modes based on the above description of the cylindrical plain bearing, a more thorough description of main bearing assembly 28b is deemed unnecessary for a full and complete understanding of this embodiment. It is recognized, however, that the main bearing assembly 28b will benefit from the convertible aspect similar to that described above.

Additionally, in this embodiment, the fluid film 69b supports both radial and longitudinal loading of main rotary shaft 26b and separate mechanisms for accommodating the longitudinal loads may not be needed. The annular abutment surfaces 134 may even include fixed inclinations, fluid or other non-planar geometries that help maintain the fluid film 69b under various operating conditions.

The plain bearings as described above may be implemented in various combinations. By way of example, the plain bearings may work in conjunction with various devices to accommodate the longitudinal loading of the main rotary shaft. In other words, the fluid film disposed between the shaft and the bearing surface, in combination with the specific geometry of the shaft and bearing surface, may not be the sole means for supporting the longitudinal load. Instead, a separate device, such as a thrust pad, may also be used to accommodate substantially all or a portion of the longitudinal load. In one such embodiment, the fluid film may accommodate the radial loading and the longitudinal loading in a first longitudinal direction, and the stationary thrust pad may accommodate the longitudinal loading in a second longitudinal direction opposite the first longitudinal direction.

Figure 9:
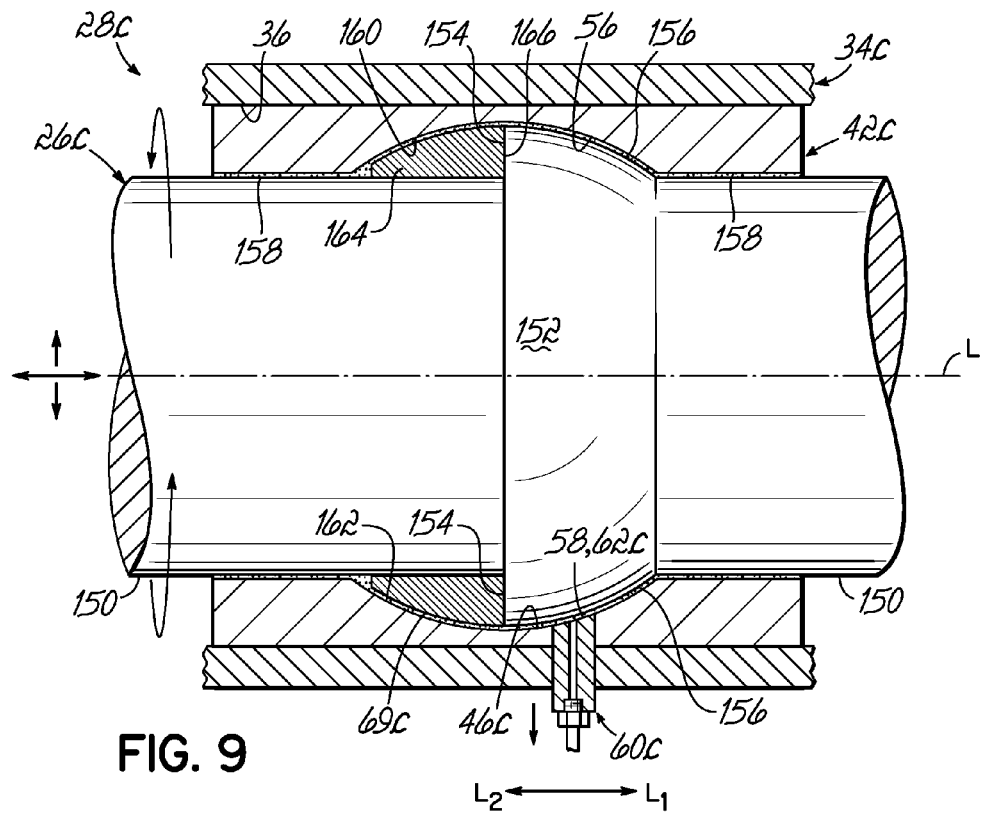
FIG. 9 is a partial cross-sectional view of a convertible main bearing assembly in accordance with still another embodiment of the invention in a hydrodynamic operating mode.

FIG. 9 illustrates an exemplary embodiment having a separate device to help support longitudinal loads. In this embodiment, in which like reference numerals refer to like features in FIGS. 3-5B, a main bearing assembly 28c cooperates with a main rotary shaft 26c having generally cylindrical, constant diameter sections 150 coupled to opposed sides of an intermediate truncated spherical section 152. The main rotary shaft 26c may be a unitary shaft or be formed from separate components which are subsequently coupled through a suitable process so as to have the noted configuration. The truncated spherical section 152 is generally larger than the cylindrical sections 150 so as to generally define a generally planar, annular abutment surface 154 and shoulders 156. The bearing surface 46c, which may be formed in a bearing insert 42c or alternatively integrally formed with the bearing housing 34c, has a similar configuration. In this regard, the bearing surface 46c includes generally cylindrical, constant diameter surface portions 158 configured to confront cylindrical sections 150 of main rotary shaft 26c, and an intermediate spherical surface portion 160 configured to confront the spherical aspect of truncated spherical section 152. The truncated aspect of truncated spherical portion 152 defines a void or cavity 162 between the main rotary shaft 26c and the bearing surface 46c.

As shown in FIG. 9, the cavity 162 is configured to receive a thrust pad 164 therein having a generally planar, annular abutment surface 166 arranged to confront abutment surface 154 of truncated spherical section 152. With this arrangement, longitudinal loading of the main rotary shaft 26c in a first longitudinal direction $L_1$ may be accommodated by the fluid film 69c between shoulders 156 and the corresponding portion of bearing surface 46c confronting shoulders 156. Longitudinal loading of the main rotary shaft 26c in a second longitudinal direction $L_2$ may be accommodated by engagement between abutment surfaces 154, 166 of truncated spherical section 152 and thrust pad 164, respectively. It should be recognized that instead of the fluid film 69c configured to support loading in the first longitudinal direction $L_1$ and the thrust pad 164 configured to support loading in the second longitudinal direction $L_2$, in an alternative embodiment, the thrust pad 164 may be configured to support the loading in the first longitudinal $L_1$ and the fluid film 69c may be configured to support the loading in the second longitudinal direction $L_2$.

In an exemplary embodiment, main bearing assembly 28c may be selectively convertible between hydrostatic and hydrodynamic operating modes similar to that explained above. Thus, bearing surface 46c may include a stationary bearing surface portion 56 and a movable bearing surface portion 58, which may, for example, be defined by one or more slides 60c (one shown) having an inner surface 62c. In the exemplary embodiment, the slide(s) 60c may be positioned to correspond to the spherical aspect of the truncated spherical section 152. However, it should be recognized that the number of slides 60c and the positioning thereof in the bearing surface 46c may vary depending on the specific application and desires of the bearing manufacturer and should not be limited to the particular number or positions shown herein. As one of ordinary skill in the art will readily appreciate the operation of slide(s) 60c and the operation of main bearing assembly 28c in the hydrostatic and hydrodynamic operating modes based on the above description of the cylindrical plain bearing, a more thorough description of main bearing assembly 28c is deemed unnecessary for a full and complete understanding of this embodiment. It is recognized, however, that the main bearing assembly 28c will benefit from the convertible aspect similar to that described above. In this embodiment, the radial load and at least part of the longitudinal load is supported by the fluid film 69c. A separate mechanism, however, is incorporated within the main bearing assembly 28c for accommodating a remainder portion of the longitudinal load. Furthermore, main bearing assembly 28c may accommodate shaft misalignments, as a result of the spherical aspect of the main bearing assembly 28c.

Figure 10:
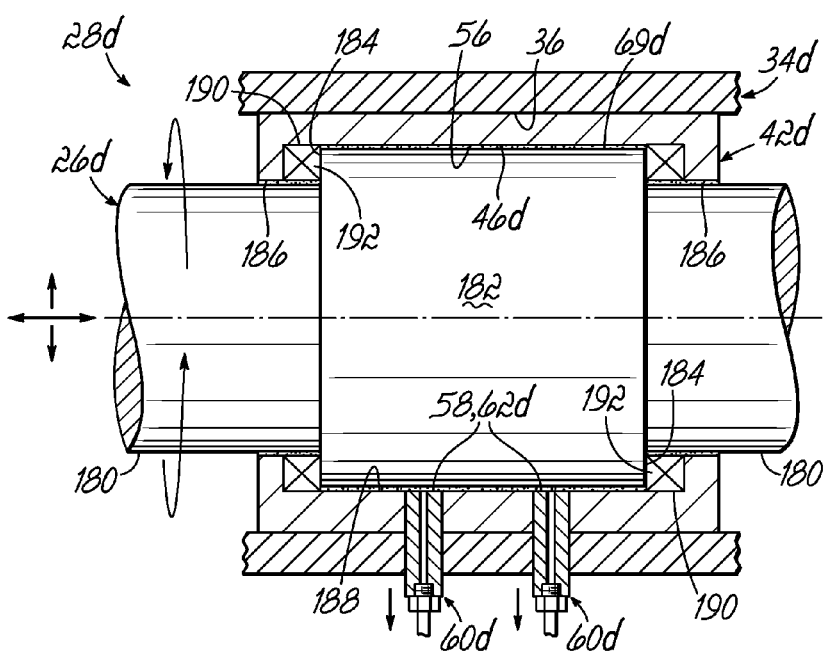
FIG. 10 is a partial cross-sectional view of a convertible main bearing assembly in accordance with another embodiment of the invention in a hydrodynamic operating mode.

Another exemplary embodiment is illustrated in FIG. 10, wherein thrust pads are used to accommodate the loading in both the first and second longitudinal directions $L_1$, $L_2$. In this embodiment, in which like reference numerals refer to like features in FIGS. 3-5B, main rotary shaft 26d includes generally cylindrical, constant diameter sections 180 coupled to opposed sides of an intermediate cylindrical, constant diameter section 182. The main rotary shaft 26d may be a unitary shaft or be formed from separate components which are subsequently coupled through a suitable process so as to have the noted configuration. The diameter of the intermediate cylindrical section 182 is generally larger than the diameter of cylindrical sections 180 so as to define two opposed, generally planar, annular abutment surfaces 184. The main bearing assembly 28d includes a bearing surface 46d, which may be formed in a bearing insert 42d or alternatively integrally formed with the bearing housing 34d, having a similar configuration. In this regard, the bearing surface 46d includes generally cylindrical, constant diameter surface portions 186 configured to confront cylindrical sections 180 of main rotary shaft 26d, and an intermediate cylindrical surface portion 188 configured to confront intermediate cylindrical section 182.

In addition, cylindrical cavities 190 may be formed in the bearing surface 46d and disposed between the intermediate cylindrical surface portion 188 and respective cylindrical surface portions 186. The diameter of the cavities 190 may be substantially equal to or larger than the diameter of the intermediate cylindrical surface portion 188 so as not to impede longitudinal movement of the main rotary shaft 26d. As shown in FIG. 10, the cavities 190 are configured to receive thrust pads, schematically shown at 192, which are in engagement or near engagement with the abutment surfaces 184 of the intermediate cylindrical section 182. As will be recognized, the thrust pads 192 accommodate the loading of the main rotary shaft 26d in the first and second longitudinal directions $L_1$ and $L_2$. The radial loading of the main rotary shaft 26d, however, may be accommodated by the fluid film 69d.

The main bearing assembly 28d may be selectively convertible between hydrostatic and hydrodynamic operating modes similar to that explained above. Thus, bearing surface 46d may include a stationary bearing surface portion 56 and a movable bearing surface portion 58, which may, for example, be defined by one or more slides 60d (two shown) having an inner surface 62d. In the exemplary embodiment, the slide(s) 60d may be positioned along the intermediate cylindrical portion 188. However, it should be recognized that the number of slides 60d and the positioning thereof in the bearing surface 46d may vary depending on the specific application and desires of the bearing manufacturer and should not be limited to the particular number or positions shown herein. As one of ordinary skill in the art will readily appreciate the operation of slide(s) 60d and the operation of main bearing assembly 28d in the hydrostatic and hydrodynamic operating modes based on the above description of the cylindrical plain bearing, a more thorough description of main bearing assembly 28d is deemed unnecessary for a full and complete understanding of this embodiment. It is recognized, however, that the main bearing assembly 28d will benefit from the convertible aspect similar to that above. Additionally, while the radial load is supported by the fluid film 69d, separate mechanisms are incorporated within main bearing assembly 28d for accommodating the longitudinal loading.

While the embodiments in FIGS. 4A-10 have been shown and described as being convertible plain bearings, the invention is not so limited. By way of example, in certain applications, the bearing configurations shown in the previous embodiments may be configured as hydrostatic or hydrodynamic plain bearings without the capacity to convert therebetween. While such embodiments may not provide the full range of benefits afforded by convertible plain bearings, such hydrostatic or hydrodynamic plain bearings may still provide certain benefits over the conventional roller element bearings currently utilized, and therefore such plain bearings are within the scope of the present invention. Those of ordinary skill in the art will recognize that for solely hydrodynamic plain bearing embodiments, slides 60, 60a, 60b, 60c, and 60d of the previous embodiments would be omitted such that bearing surfaces 46, 46a, 46b, 46c and 46d have a substantially smooth topology. Those of ordinary skill in the art will further recognize that for solely hydrostatic plain bearing embodiments, the slides 60, 60a, 60b, 60c and 60d may be replaced with permanent formations in the wall that defines bearing surfaces 46, 46a, 46b, 46c and 46d so as to define the pocket or fluid cavities.

Figure 11A:
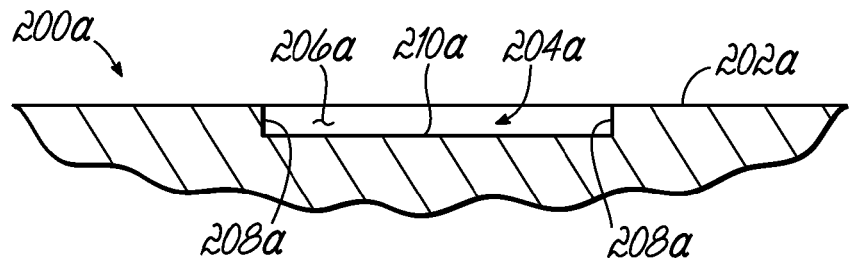
FIG. 11A is a diagrammatic illustration of a hydrostatic plain bearing having a fluid cavity with a rectangular configuration.
Figure 11B:
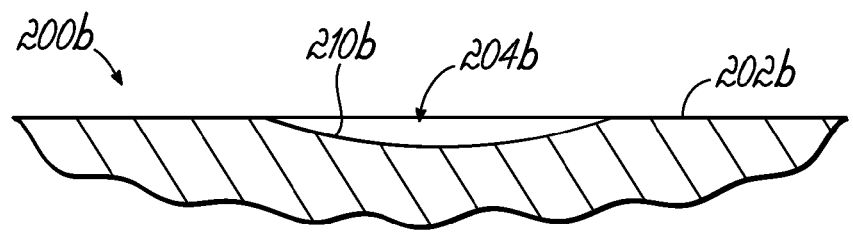
FIG. 11B is a diagrammatic illustration of another hydrostatic plain bearing having a fluid cavity with an arcuate configuration.
Figure 11C:
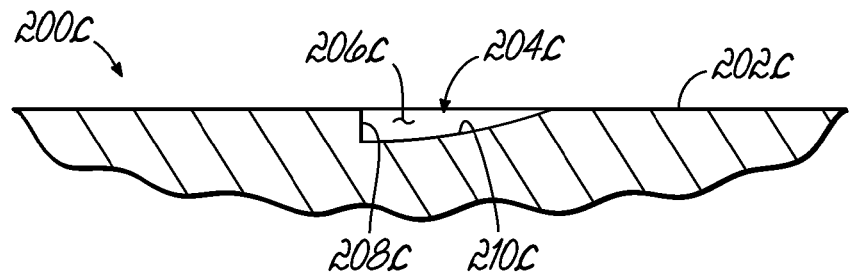
FIG. 11C is a diagrammatic illustration of yet another hydrostatic plain bearing having a fluid cavity with a wedge configuration.

By way of example, and as schematically illustrated in FIGS. 11A-11C, a hydrostatic plain bearing 200 may include a bearing surface 202 having cavities 204 with various configurations. In this regard, FIG. 11A illustrates a hydrostatic plain bearing 200a having a bearing surface 202a with a permanent fluid cavity 204a formed therein. In this embodiment, the cavity 204a has a rectangular configuration with generally opposed side walls 206a (one shown), generally opposed end walls 208a, and a bottom wall 210a. It is noted that the fluid cavities formed in the convertible plain bearings discussed above (e.g., cavities 76) have such a configuration when in the hydrostatic mode. FIG. 11B illustrates an alternative embodiment of a hydrostatic plain bearing 200b having a bearing surface 202b with a permanent cavity 204b formed therein. In this embodiment, the cavity 204b has a curved or arcuate configuration including, for example, a single bottom wall 210b that intersects the bearing surface 202b at both of its ends. In still a further alternative embodiment illustrated in FIG. 11C, a hydrostatic plain bearing 200c may include a bearing surface 202c having a cavity 204c with a wedge configuration. In this embodiment, the bottom wall 210c intersects the bearing surface 202c at one of its ends, but is spaced from the bearing surface 202c at its opposed end so as to define opposed side walls 206c (one shown) and an end wall 208c. This provides the cavity 204c with a varying depth. The wedge profile may be in the direction of shaft rotation or may be opposite to the direction of shaft rotation.

In addition to the above, the number and location of the cavities 204 in the bearing surface 202 may vary depending on the particular application and type of plain bearing. Indeed, this is the case whether the plain bearing is a convertible plain bearing or a solely hydrostatic plain bearing. Thus, while the previous embodiments typically illustrated two slides that formed corresponding fluid cavities, and the slides were typically formed in the lower portion of the bearing surfaces, the invention is not so limited. By way of example and not limitation, FIGS. 12A-12C illustrate an alternative fluid cavity pattern for a cylindrical hydrostatic plain bearing similar to that shown in FIGS. 5A and 5B.

In this regard, a main shaft (not shown) similar to shaft 26 extends through a main bearing assembly 220 having a bearing housing 222 that defines a bearing surface 224 that confronts the main shaft. The main bearing assembly 220 is configured as a hydrostatic plain bearing and therefore includes a plurality of fluid cavities 226 permanently formed in the bearing surface 224. In an exemplary embodiment, there may be six fluid cavities 226 formed in bearing surface 224. The fluid cavities 226 may be configured as any one of those illustrated in FIGS. 11A-11C or a combination thereof. In one embodiment, the cavity pattern may be symmetrical relative to a midline plane 228 parallel to gravitational field g and through the center of the bearing assembly 220, but asymmetrical relative to a midline plane 229 perpendicular to the midline plane 228 and through the center of the bearing assembly (FIG. 12B). Accordingly, only half of the bearing surface 224 will be described in detail. It should be recognized, however, that in alternative embodiments, the cavity pattern may be asymmetrical about midline plane 228. Additionally, it should be noted that symmetry of the cavity pattern takes into account number and location but not the cavity geometry itself. All of the fluid cavities 226, for example, may have the wedge-shaped configuration of FIG. 11C with the wedge profile in the direction of shaft rotation.

In reference to FIG. 12C, two cavities 226a may be positioned in a lower portion of the bearing surface 224 and a single cavity 226b may be positioned in an upper portion of the bearing surface 224. The upper and lower portions are defined with reference to the midline plane 229. In an exemplary embodiment, cavities 226a have substantially the same circumferential location along the bearing surface 224, details of which are discussed below, but are spaced in the longitudinal direction (e.g., along longitudinal axis L) so as to be substantially parallel to each other. The cavities 226a may have a width in the longitudinal direction of about 85 mm and be equally spaced from opposed ends 230 of the bearing surface 224. For example, the cavities 226a may be spaced about 87 mm from the ends 230 of the bearing surface 224. Each cavity 226a extends in a generally circumferential direction and is located within a region starting at about 15 degrees and terminating at about 60 degrees. More particularly, each cavity 226a may include a first edge 232 at about 20.5 degrees and a second edge 234 at about 57 degrees. In an exemplary embodiment, the cavities 226a may have a maximum depth of about 4 mm, although other values are possible.

The cavity 226b in the upper portion of the bearing surface 224 may have a width in the longitudinal direction similar to cavities 226a (e.g., 85 mm) and be centrally located in bearing surface 224 relative to the longitudinal direction. For example, cavity 226b may be positioned in bearing surface 224 intermediate the cavities 226a and may be at the longitudinal midpoint between ends 230. Cavity 226b may similarly extend in a generally circumferential direction (so as to be generally parallel to cavities 226a) and be located in a region starting at about 85 degrees and terminating at about 130 degrees. In one specific embodiment, cavity 226b may include a first edge 236 at about 90 degrees and a second edge 238 at about 125 degrees. Cavity 226b may be configured to have a maximum depth similar to that of cavities 226a, although not so limited. As noted above, the cavity pattern is symmetrical about midline plane 228 and therefore, the cavity pattern on a second side of midline plane 228 is a mirror reflection of the cavity pattern on the first side of the midline plane 228.

The cavity pattern illustrated in FIGS. 12A-12C is but one exemplary configuration which may be advantageous for cylindrical plain bearing designs. Those of ordinary skill in the art will appreciate that the pattern (e.g., number, location and type) and physical dimensions as provided above may vary depending on the particular application and configuration of the plain bearing. For example, FIGS. 13A-13C illustrate a cavity pattern which may be more suitable for a hydrostatic plain bearing having a spherical configuration similar to that shown in FIG. 7.

In this regard, a main shaft (not shown) similar to shaft 26a extends through a main bearing assembly 250 having a bearing housing 252 that defines a bearing surface 254 that confronts the main shaft. The main bearing assembly 250 is configured as a hydrostatic plain bearing and therefore includes a plurality of cavities 256 permanently formed in the bearing surface 254. In an exemplary embodiment, there may be eight fluid cavities 256 formed in bearing surface 254. The fluid cavities 256 may be configured as any one of those illustrated in FIGS. 11A-11C or a combination thereof. In one embodiment, the cavity pattern may be symmetrical relative to a midline plane 258 parallel to gravitational field g and through the center of the main bearing assembly 250, but asymmetrical relative to a midline plane 259 perpendicular to the midline plane 258 and through the center of the bearing assembly (FIG. 13B). Accordingly, only the bearing surface 254 on one side of the symmetrical plane (midline plane 258) will be described in detail. It should be recognized, however, that in alternative embodiments, the cavity pattern may be asymmetrical about midline plane 258 and/or symmetrical about midline plane 259.

Figure 13A:
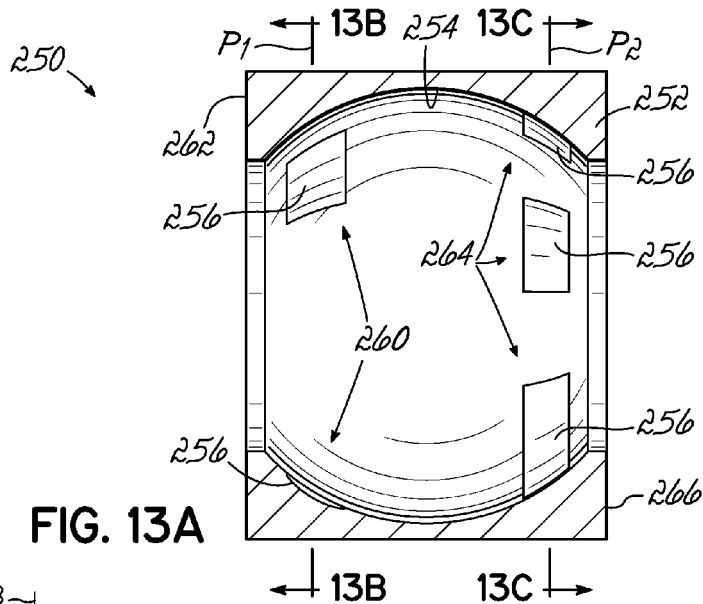
FIG. 13A is a partial cross-sectional view of a spherical hydrostatic main bearing assembly for a wind turbine in accordance with another embodiment of the invention.
Figure 13B:
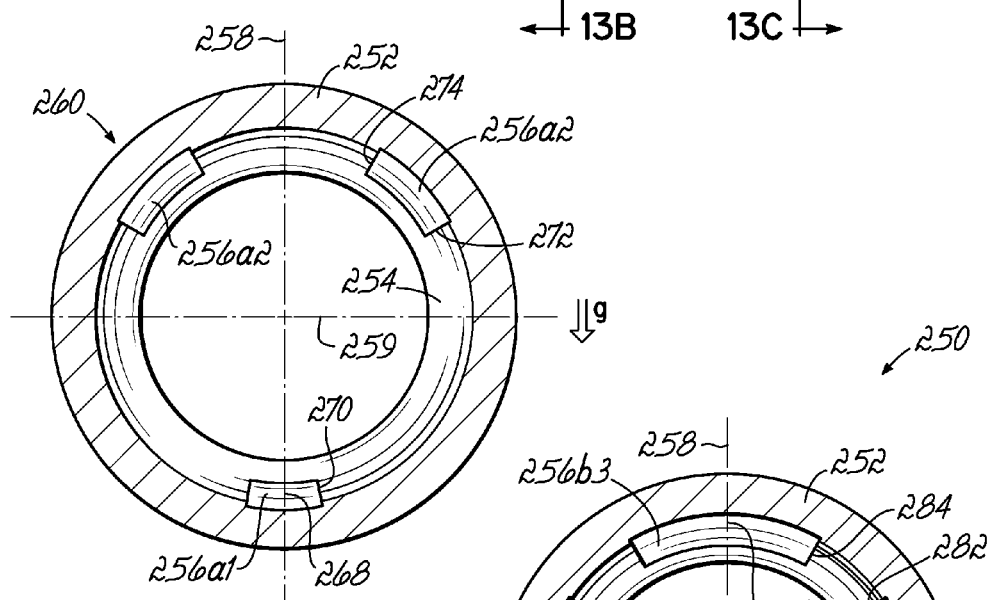
FIG. 13B is another cross-sectional view of the hydrostatic main bearing assembly of FIG. 13A taken generally along line 13B-13B.
Figure 13C:
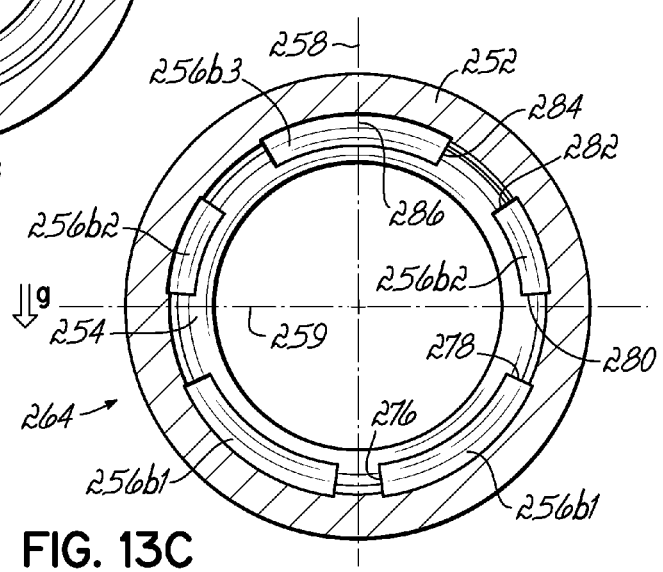
FIG. 13C is another cross-sectional view of the hydrostatic main bearing assembly of FIG. 13A taken generally along line 13C-13C.

In reference to FIGS. 13A-13C, a first group 260 of cavities 256a is circumferentially spaced about the bearing surface 254 at a first longitudinal position (e.g., plane $P_1$) adjacent a first end 262 of the bearing surface 254, and a second group 264 of cavities 256b is circumferentially spaced about the bearing surface 254 at a second longitudinal position (e.g., plane $P_2$) adjacent a second end 266 of the bearing surface 254. In one embodiment, the second group 264 may include more fluid cavities as compared to the first group 260 in order to more readily accommodate the longitudinal loading of the shaft caused by the wind interacting with the blades 22.

The first group 260 of cavities 256a includes a first cavity 256a1 in the lower portion of the bearing surface 254 and a second cavity 256a2 in an upper portion of the bearing surface 254 (e.g., an upper side portion), the upper and lower portions being defined with reference to the midline plane 259. The cavities 256a may have a width in the longitudinal direction of about 125 mm and be spaced from the first end 262 of the bearing surface 254 by about 81 mm. The cavities 256a may extend in a generally circumferential direction. To this end, in the circumferential direction, the midline 268 of the first cavity 256a1 starts at zero degrees and has a first edge 270 terminating by about 15 degrees, and more particularly at about 12 degrees. The second cavity 256a2 is located in a region starting at about 115 degrees and terminating at about 155 degrees. More particularly, in one embodiment the second cavity 256a2 may include a first edge 272 at about 120 degrees and a second edge 274 at about 150 degrees. In an exemplary embodiment, the cavities 256a may have a maximum depth of about 4 mm, although other values are possible.

The second group 264 of cavities 256b includes a first cavity 256b1 in the lower portion of the bearing surface 254, a second cavity 256b2 in the upper portion of the bearing surface 254 between the midline planes 258 and 259, and a third cavity 256b3 in the upper portion of the bearing surface 254 intersecting the midline plane 258. The cavities 256b may have a width in the longitudinal direction of about 101 mm and be spaced from the second end 266 of the bearing surface 254 by about 81 mm. The cavities 256b may likewise extend in a generally circumferential direction. To this end, in the circumferential direction, the first cavity 256b1 is located in a region starting at about 5 degrees and terminating at about 70 degrees. More particularly, in one embodiment the first cavity 256b1 may include a first edge 276 at about 8 degrees and a second edge 278 at about 66 degrees. The second cavity 256b2 is located in a region starting at about 90 degrees and terminating at about 130 degrees. More particularly, in one embodiment the second cavity 256b2 may include a first edge 280 at about 94 degrees and a second edge 282 at about 124 degrees. Lastly, the third cavity 256b3 may be located within a region starting at about 145 degrees. For example, the third cavity 256b3 may include a first edge 284 at about 150 degrees and have a midline 286 at 180 degrees. In an exemplary embodiment, the cavities 256b may have a maximum depth similar to that of cavities 256a, although not so limited. As noted above, the cavity pattern is symmetrical about midline plane 258 and therefore, the cavity pattern on a second side of midline plane 258 is a mirror reflection of the cavity pattern on the first side of the midline plane 258. Again, however, the cavity pattern is asymmetrical about midline plane 259.

The cavity pattern illustrated in FIGS. 13A-13C is but one exemplary configuration which may be advantageous for spherical plain bearing designs. Those of ordinary skill in the art will appreciate that the pattern (e.g., number and location), type, and physical dimensions as provided above may vary depending on the particular application and configuration of the plain bearing. It should be recognized that the cavity pattern and type in the bearing surface may be optimized for the particular configuration of the plain bearing, whether that be a cylindrical plain bearing, a spherical plain bearing or some other configuration. The exemplary embodiments discussed above are believed to be particularly suited for the loading conditions associated with wind turbines.

In a further aspect, the wind turbine 10 may include a control system having a wind turbine controller, schematically shown at 300 (FIGS. 15 and 16), operatively coupled to the main bearing assembly for controlling operation of the wind turbine 10 based on certain conditions in the main bearing assembly. In an exemplary embodiment, when potentially damaging or undesirable conditions exist in the main bearing assembly, the controller 300 may be configured to change the dynamic state of the wind turbine 10 or additionally or alternatively modify a feature or characteristic of the main bearing assembly itself so as to reduce the likelihood of damage to the main bearing assembly. In this way, the operating life of the main bearing assembly will be extended. It is to be understood that the controller 300 may be configured to operate with a bearing assembly that is configured as a hydrodynamic plain bearing, a hydrostatic plain bearing, or a convertible plain bearing. Thus, while the embodiments discussed below illustrate convertible plain bearings, it should be recognized that the controller 300 may also be used with non-convertible plain bearing designs as well, such as those illustrated in FIGS. 12A-13C. Thus, the control system as described herein is not limited to convertible plain bearings.

To this end, the wind turbine controller 300 may be operatively coupled to one or more sub-systems (having controllers which may be separate or integrated within controller 300) effective to alter the dynamic state of the wind turbine 10. By way of example and without limitation, the controller 300 may be operatively coupled to: i) a yaw controller (not shown) for controlling the yaw of the rotor 16 about tower 12; ii) a pitch controller (not shown) for controlling the pitch of the blades 22 relative to the wind direction; and/or iii) a brake system (not shown) for resisting the rotation of the rotor 16 about the longitudinal axis 24. These various sub-systems have the capability of affecting the dynamic state of wind turbine 10. More particularly, and as discussed in more detail below, these sub-systems have the ability to affect the loading on the main rotary shaft, which in turn affects operation of the main bearing assembly. The sub-systems provided above are exemplary and those of ordinary skill in the art may recognize other sub-systems that affect the dynamic state of the wind turbine 10. In addition to the above, the wind turbine controller 300 may be further operatively coupled to the main bearing assembly and capable of affecting the state of the main bearing assembly so as to better accommodate the loads on the main rotary shaft.

Figure 14:
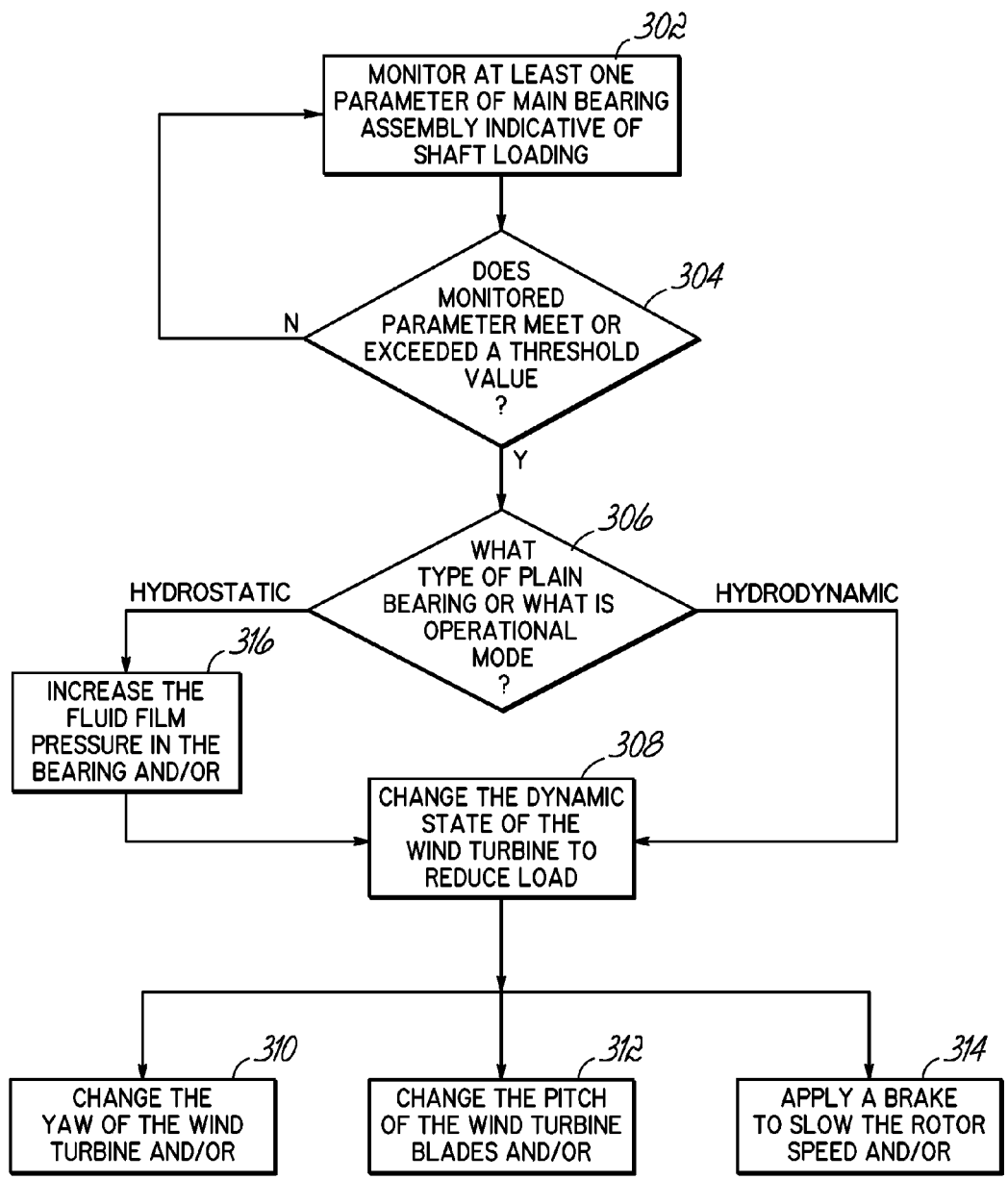
FIG. 14 is a flow chart illustrating the logic of a control system for a wind turbine in accordance with another embodiment of the invention.

In accordance with an aspect of the invention, and in reference to FIG. 14, the controller 300 may monitor one or more parameters associated with operation of the main bearing assembly, as in step 302. In an exemplary embodiment, the monitored parameter(s) is generally indicative of the loads applied to the main rotary shaft; several examples are described in greater detail below. The monitored parameter(s) is then compared to a threshold value(s) stored in controller 300, as in step 304. If the monitored parameter(s) is less than the threshold value(s) then the wind turbine 10 continues to operate without intervention from this particular control system. If, on the other hand, the monitored parameter(s) meets or exceeds the threshold value(s), then the controller 300 is configured to alter the operation of the wind turbine 10 so as to reduce the load on the main rotary shaft, or change the operating condition of main bearing assembly so as to more readily accommodate the load on the shaft. This decision may depend on the type of plain bearing or the operating mode in the case of a convertible main bearing assembly, as indicated at 306 of FIG. 14.

If the main bearing assembly is a hydrodynamic plain bearing or is a convertible plain bearing, such as in accordance with that described above, operating in a hydrodynamic mode and the monitored parameter(s) meets or exceeds the threshold value(s) then the controller 300 may be configured to alter the dynamic state of the wind turbine 10 to reduce the load on the shaft, as indicated at 308. In this regard, the controller 300 may be configured to yaw the rotor 16 relative to the tower 12 so as to turn the rotor 16 out of the wind, as indicated at 310. Additionally or alternatively, the controller 300 may be configured to pitch the rotor blades 22 out of the wind so as to reduce the driving force of the rotor 16, and thus the loading of the main rotary shaft, as at 312. Still further additionally or alternatively, the controller 300 may be configured to apply a brake and thereby slow the angular velocity of the main rotary shaft, as at 314. Those of ordinary skill in the art may recognize other ways to reduce the loading on the main rotary shaft 26 upon reaching threshold value(s) in the monitored parameter(s) and embodiments of the invention are not limited to those identified above. In any event, altering the dynamic state of the wind turbine 10 in such a manner is configured to prevent or reduce the likelihood of damaging the main bearing assembly and shortening its operating life.

If the main bearing assembly is a hydrostatic plain bearing or is a convertible plain bearing operating in a hydrostatic mode, then another option may be available for operating the wind turbine 10 in the event the threshold value(s) of the monitored parameter(s) is exceeded. In this regard, and as further illustrated in FIG. 14, if the threshold value(s) is exceeded and the bearing or operating mode is hydrostatic, then the controller 300 may be configured to increase the pressurization of the fluid film between the shaft and the bearing surface, as indicated at 316, so that the main bearing assembly may better accommodate the load on the shaft. This may be achieved, for example, by increasing the output of the pump 70. Similar to the above, altering the pressurization of the fluid film in the main bearing assembly is configured to prevent or reduce the likelihood of damaging the main bearing assembly and shortening its operating life.

Figure 15:
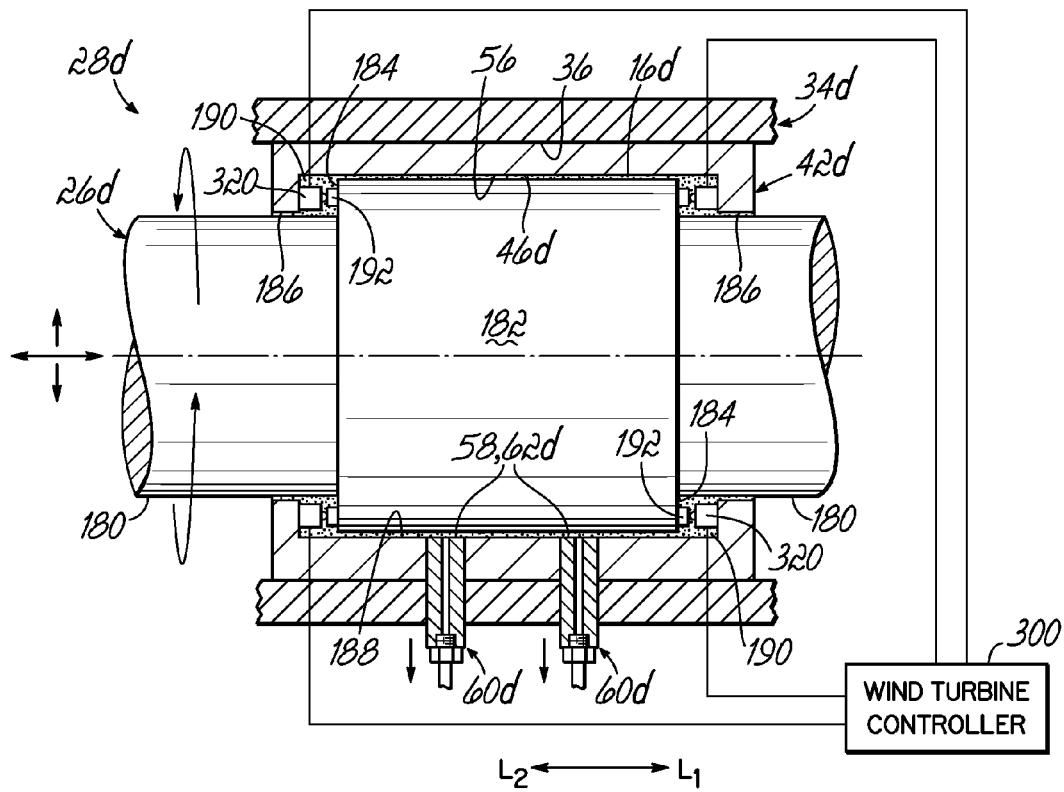
FIG. 15 is a partial cross-sectional view of a convertible main bearing assembly similar to that shown in FIG. 10, but having load cells for monitoring the load on the wind turbine shaft.
Figure 16:
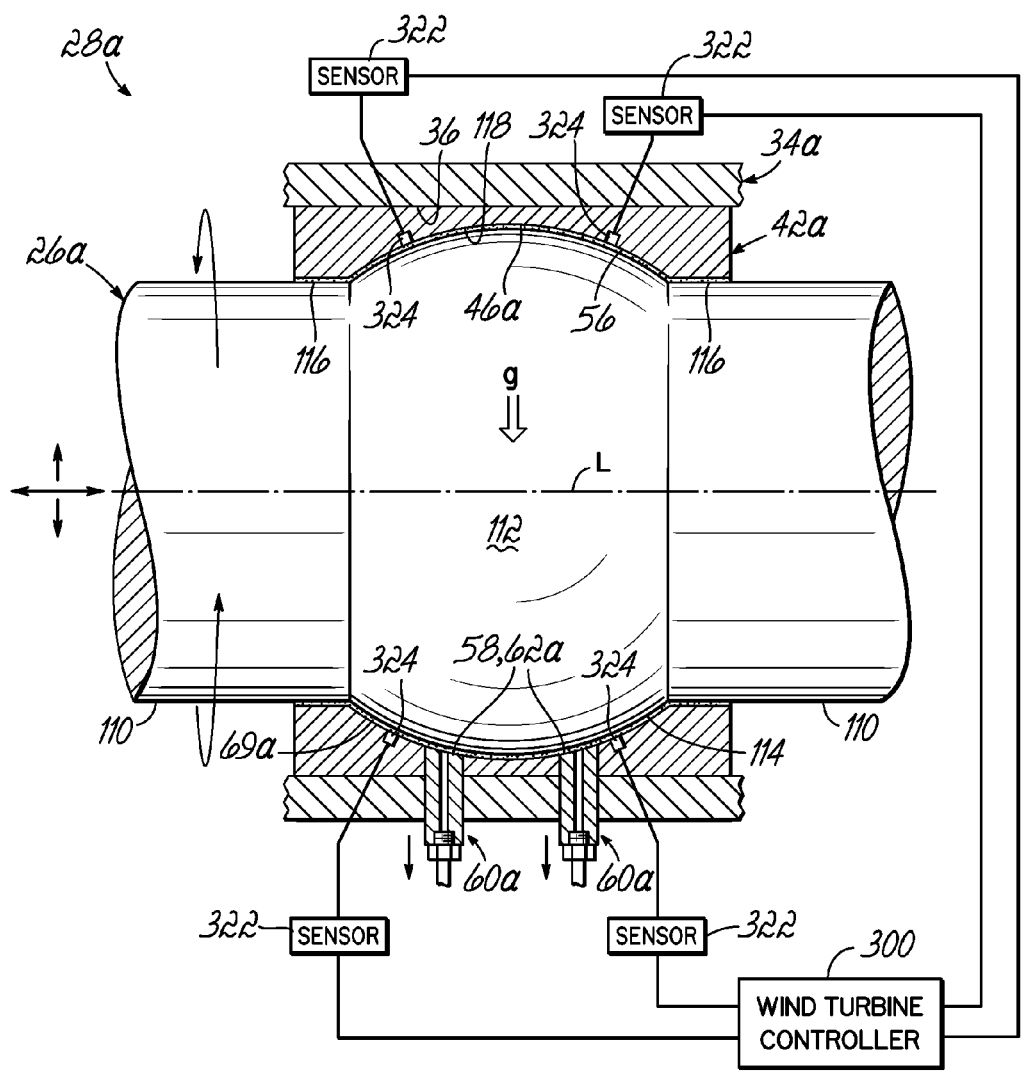
FIG. 16 is a partial cross-sectional view of a convertible main bearing assembly similar to that shown in FIG. 7, but having sensors for monitoring the load on the wind turbine shaft.

In one embodiment, the monitored parameter(s) may be a direct indication of the load on the main rotary shaft. This may particularly be the case when the load being monitored is the longitudinal load, which may not, for example, depend on the fluid film for its support in the main bearing assembly. Thus, for example, such a direct technique may be suitable when thrust pads are used to accommodate the longitudinal loading of the main rotary shaft, such as in FIGS. 9 and 10. Such an exemplary embodiment is illustrated in FIG. 15, wherein a controller 300 is incorporated into the embodiment shown in FIG. 10. As illustrated in this figure, each of the thrust pads 192 may be operatively coupled to a load cell 320 for indicating the longitudinal loads on the main rotary shaft 26d. Such load cells 320 are generally known in the art and are commercially available. Thus, a detailed description of the load cells 320 is considered unnecessary. The load cells 320 are operatively coupled to the wind turbine controller 300 and are configured to send a signal indicative of the longitudinal loads on the main rotary shaft 26d. As explained above, if the longitudinal loads, in either the $L_1$ or $L_2$ directions exceed a threshold value, then operation of the wind turbine 10 may be altered by changing the dynamic state of the wind turbine 10 or by changing the operating condition of the main bearing assembly 28d, as was explained above.

While such a direct technique for indicating load may be conducive when thrust pads are used, other techniques may be implemented when the load on the main rotary shaft is being supported by the fluid film (e.g., such as in a radial direction). In one embodiment and in reference to FIG. 16, wherein like reference numerals refer to like features in FIG. 7, various indirect techniques may be implemented wherein one or more properties of the fluid film 69a are monitored to provide an indication of the load on the shaft 26a. In this regard, one or more sensors, schematically illustrated at 322, may be in communication with the fluid film 69a between the shaft 26a and the bearing surface 46a for monitoring at least one property of the fluid film 69a. The sensors 322 may further be operatively coupled to controller 300 for affecting the operation of the wind turbine 10 in the event a potentially damaging or undesirable condition may exist in the main bearing assembly 28a.

In one embodiment, the property of the fluid film being monitored by sensors 322 is the pressure. In this regard, the sensors 322 may be pressure transducers capable of measuring the pressure of the fluid film 69a at certain locations, which may be selected by locating one or more suitable ports 324 in the bearing surface 46. Such pressure transducers are generally known in the art and are commercially available. Thus, a detailed description of the pressure transducers is considered unnecessary. The ports 324 may be strategically located so as to correspond to potential failure sites in the event the main rotary shaft 26a is overloaded. For example, the ports 324 may be located in the direction of the gravitational field g. Alternatively, the ports 324 may be located adjacent the shoulders 114. Other locations are also possible such as being adjacent the slides 60a. The pressure transducers are operatively coupled to the controller 300 and are configured to send a pressure signal indicative of the load on the main rotary shaft 26a. If the pressure, as indicated by the pressure transducer, exceeds a threshold value, then operation of the wind turbine 10 may be altered by changing the dynamic state of the wind turbine 10 or by pressurization of the fluid film 69a, as was more fully explained above.

In another embodiment, the property of the fluid film being monitored by sensors 322 is the temperature. In this regard, the sensors 322 may be temperature sensors capable of measuring the temperature of the fluid film 69a at certain locations, which may be selected by locating one or more suitable ports 324 in the bearing surface 46a. Such temperature sensors are generally known in the art and are commercially available. Thus, a detailed description of the temperature sensors is considered unnecessary. The temperature sensors are operatively coupled to the controller 300 and are configured to send a temperature signal indicative of the load on the main rotary shaft 26a. If the temperature, as indicated by the temperature sensors, exceeds a threshold value, then operation of the wind turbine 10 may be altered by changing the dynamic state of the wind turbine 10 or by pressurization of the fluid film, as explained above.

In still a further embodiment, the property of the fluid film being monitored by sensors 322 is the film thickness. In this regard, the sensors 322 may be film thickness sensors or proximity sensors capable of measuring or indicating the thickness of the fluid film 69a (i.e., the proximity of the shaft to the bearing surface) at certain locations. For example and without limitation, the film thickness sensors may operate on an inductive or capacitive theory (e.g., proximity sensors). Such sensors are generally known in the art and are commercially available. Thus, a detailed description of the types of sensors is considered unnecessary. Other sensors operating on a host of other principles or theories may also be used. The proximity sensors are operatively coupled to the controller 300 and are configured to send a distance signal indicative of the load on the main rotary shaft 26a. If the film thickness, as indicated by the proximity sensors, exceeds a threshold value (e.g., drops below a threshold value), then operation of the wind turbine 10 may be altered by changing the dynamic state of the wind turbine 10 or by increased pressurization of the fluid film 69a, as was more fully explained above.

By monitoring, either directly or indirectly, the load on the main rotary shaft, then operation of the wind turbine 10 during conditions potentially harmful to the main bearing assembly may be avoided. Such a control system should increase the operating life of the main bearing assembly and therefore, reduce the replacement and maintenance costs associated with the overall operation of the wind turbine.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, while the convertible bearing assembly was described and shown as having the fluid pockets formed in the bearing surface, it should be recognized that the fluid pockets may alternatively be formed in the shaft. Additionally, while the convertible bearing assembly was shown and described herein as a main bearing assembly for a wind turbine, it should be further recognized that the bearing assemblies as disclosed herein may be implemented in other locations of the wind turbine including, for example and without limitation, the gearbox, the yaw system, the pitch system for the blades, or other locations that conventionally rely on roller element bearings. The invention in its broader aspects is therefore not limited to the specific details, representative methods, and illustrative examples shown and described. Accordingly, departures may be made from such details without departing from the spirit or scope of the general inventive concept.

What is claimed is:

1. A plain bearing assembly for a wind turbine configured to receive a shaft, comprising:
    a bearing housing including a passageway configured to receive the shaft therein;
    a bearing surface defining the passageway and having a generally cylindrical configuration, the bearing surface including a lower portion and an upper portion defined relative to a first midline plane extending through a center of the passageway and generally perpendicular to a gravitational field, the bearing surface further including a first side and a second side defined relative to a second midline plane extending through a center of the passageway and generally parallel to the gravitational field; and
    a plurality of fluid cavities in the bearing surface, at least one fluid cavity being located in the lower portion of the bearing surface and at least one fluid cavity being located in the upper portion of the bearing surface,
    wherein the at least one fluid cavity located in the lower portion of the bearing surface further comprises a first pair of longitudinally spaced fluid cavities on the first side of the bearing surface, and a second pair of longitudinally spaced fluid cavities on the second side of the bearing surface.

2. The plain bearing assembly according to claim 1, wherein each of the first pair of longitudinally spaced fluid cavities extends in a generally circumferential direction and is in a region starting at about 15 degrees and terminating at about 60 degrees.

3. The plain bearing assembly according to claim 1, wherein each of the first pair of longitudinally spaced fluid cavities is generally parallel to each other.

4. The plain bearing assembly according to claim 1, wherein the second pair of longitudinally spaced fluid cavities is a mirror reflection of the first pair of fluid cavities about the second midline plane.

5. The plain bearing assembly according to claim 1, wherein the at least one fluid cavity located in the upper portion of the bearing surface further comprises:
    a first fluid cavity on the first side of the bearing surface; and
    a second fluid cavity on the second side of the bearing surface.

6. The plain bearing assembly according to claim 5, wherein the first fluid cavity extends in a generally circumferential direction and is in a region starting at about 90 degrees and terminating at about 130 degrees.

7. The plain bearing assembly according to claim 5, wherein the second fluid cavity is a mirror reflection of the first fluid cavity about the second midline plane.

8. The plain bearing assembly according to claim 5, wherein the first fluid cavity in the upper portion of the bearing surface is generally parallel to each of the first pair of longitudinally spaced fluid cavities in the lower portion of the bearing surface.

9. The plain bearing assembly according to claim 5, wherein the first fluid cavity in the upper portion of the bearing surface is disposed longitudinally between the first pair of fluid cavities in the lower portion of the bearing surface.

10. The plain bearing assembly according to claim 1, wherein the plain bearing assembly is configured as a convertible plain bearing.

11. The plain bearing assembly according to claim 1, wherein the plurality of fluid cavities forms a cavity pattern that is symmetric about the second midline plane.

12. The plain bearing assembly according to claim 1, wherein the plurality of fluid cavities forms a cavity pattern that is asymmetric about the first midline plane.

13. The plain bearing assembly according to claim 1, wherein the plurality of fluid cavities have a rectangular configuration, a curved configuration, a wedge configuration, or a combination thereof.

14. The plain bearing assembly according to claim 1, wherein the bearing assembly is configured as the main bearing assembly of the wind turbine.

15. A wind turbine, comprising:
    a tower;
    a nacelle located adjacent a top of the tower;
    a rotor having a hub and a plurality of blades extending therefrom and configured to interact with the wind to rotate the rotor;
    a main rotary shaft coupled to the rotor and extending within the nacelle; and
    a main bearing assembly positioned in the nacelle for supporting the shaft therein, the main bearing assembly comprising a plain bearing assembly according to claim 1.

* * * * *